United States Patent
Zhang et al.

(10) Patent No.: US 12,166,706 B2
(45) Date of Patent: *Dec. 10, 2024

(54) TRANSMISSION PREEMPTION IN MULTI-TRP OPERATION

(71) Applicant: QUALCOMM Incorporated, San Diego, CA (US)

(72) Inventors: Xiaoxia Zhang, San Diego, CA (US); Tamer Kadous, San Diego, CA (US); Srinivas Yerramalli, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 541 days.

This patent is subject to a terminal disclaimer.

(21) Appl. No.: 17/394,242

(22) Filed: Aug. 4, 2021

(65) Prior Publication Data

US 2021/0377968 A1    Dec. 2, 2021

Related U.S. Application Data

(63) Continuation of application No. 16/436,774, filed on Jun. 10, 2019, now Pat. No. 11,108,598.

(Continued)

(51) Int. Cl.
*H04L 5/00*    (2006.01)
*H04W 72/23*    (2023.01)
(Continued)

(52) U.S. Cl.
CPC .......... *H04L 5/0048* (2013.01); *H04W 72/23* (2023.01); *H04B 7/0613* (2013.01);
(Continued)

(58) Field of Classification Search
CPC ............................ H04L 5/0048; H04W 72/23
See application file for complete search history.

(56) References Cited

U.S. PATENT DOCUMENTS 9,344,123 B2    5/2016   Callard et al.
11,108,598 B2 *  8/2021   Zhang ................. H04B 7/0613
(Continued)

FOREIGN PATENT DOCUMENTS

CN    104054378 A    9/2014
CN    107078874 A    8/2017
(Continued)

OTHER PUBLICATIONS

International Preliminary Report on Patentability—PCT/US2019/036465, The International Bureau of WIPO—Geneva, Switzerland, Dec. 24, 2020.

(Continued)

*Primary Examiner* — Kevin C. Harper
(74) *Attorney, Agent, or Firm* — Holland & Hart LLP

(57) ABSTRACT

Methods, systems, and devices for wireless communications are described. In a wireless communications system, multiple transmission/reception points (TRPs) may perform a joint transmission to a user equipment (UE) such that the UE may rely on demodulation reference signals (DMRSs) from the TRPs for channel estimation and data demodulation to receive the joint transmission. When TRP transmissions are punctured, which may introduce reception errors at a receiving UE, one or more TRPs may transmit unique DMRSs such that each TRP transmits a DMRS that is unique to the transmitting TRP, transmit DMRSs that are unique to punctured resource elements (REs), or determine to refrain from transmitting on punctured REs. In some cases, TRPs may transmit preemption indications (PIs) to a UE, where the PIs may indicate punctured (e.g., or not utilized) REs to allow the UE to utilize a unique DMRS for channel estimation or to ignore the punctured REs.

24 Claims, 18 Drawing Sheets

Related U.S. Application Data

(60) Provisional application No. 62/683,600, filed on Jun. 11, 2018.

(51) Int. Cl.
　　*H04B 7/06*　　　(2006.01)
　　*H04L 25/02*　　 (2006.01)
　　*H04W 72/566*　 (2023.01)

(52) U.S. Cl.
　　CPC .......... *H04L 5/0007* (2013.01); *H04L 5/0053* (2013.01); *H04L 25/0228* (2013.01); *H04W 72/569* (2023.01)

(56) References Cited

U.S. PATENT DOCUMENTS

| | | | |
|---|---|---|---|
| 2012/0113842 A1* | 5/2012 | Zhang | H04L 5/0051 370/252 |
| 2012/0329400 A1* | 12/2012 | Seo | H04L 5/0051 455/63.1 |
| 2013/0064196 A1 | 3/2013 | Gao et al. | |
| 2014/0071936 A1 | 3/2014 | Zhang et al. | |
| 2014/0226541 A1 | 8/2014 | Xu et al. | |
| 2016/0007341 A1 | 1/2016 | Nogami et al. | |
| 2018/0041316 A1 | 2/2018 | Ko et al. | |
| 2018/0270799 A1 | 9/2018 | Noh et al. | |
| 2019/0159135 A1 | 5/2019 | Molavianjazi et al. | |
| 2019/0222400 A1 | 7/2019 | Bagheri et al. | |
| 2019/0239196 A1 | 8/2019 | Lee et al. | |
| 2019/0246378 A1 | 8/2019 | Islam et al. | |
| 2019/0334672 A1 | 10/2019 | Byun et al. | |
| 2019/0349960 A1 | 11/2019 | Li et al. | |
| 2019/0379506 A1 | 12/2019 | Cheng | |
| 2019/0379561 A1 | 12/2019 | Zhang et al. | |
| 2020/0028640 A1 | 1/2020 | Yeo et al. | |
| 2020/0177416 A1 | 6/2020 | Jiang et al. | |
| 2020/0244317 A1 | 7/2020 | Wu et al. | |

FOREIGN PATENT DOCUMENTS

| | | |
|---|---|---|
| CN | 108111275 A | 6/2018 |
| WO | WO-2017222257 A1 | 12/2017 |

OTHER PUBLICATIONS

International Search Report and Written Opinion—PCT/US2019/036465—ISA/EPO—Nov. 29, 2019.

Partial International Search Report—PCT/US2019/036465—ISA/EPO—Oct. 1, 2019.

Samsung: "Enhancements for Non-Coherent JT", 3GPP Draft; R1-1612413 Comp Non-Coherent JT, 3rd Generation Partnership Project (3GPP), Mobile Competence Centre; 650, Route Des Lucioles; F-06921 Sophia-Antipolis Cedex ; France, vol. RAN WG1, No. Reno, USA; Nov. 14, 2016-Nov. 18, 2016 Nov. 13, 2016, XP051176361, Retrieved from the Internet: URL:http://www.3gpp.org/ftp/Meetings_3GPP_SYNC/RAN1/Docs/ [retrieved on Nov. 13, 2016], sections 2 and 4, 3 pages.

\* cited by examiner

TRANSMISSION PREEMPTION IN MULTI-TRP OPERATION

CROSS REFERENCE

The present Application for Patent claims priority to U.S. patent application Ser. No. 16/436,774 by ZHANG et al., entitled "TRANSMISSION PREEMPTION IN MULTI-TRP OPERATION" filed Jun. 10, 2019, which claims the benefit of U.S. Provisional Patent Application No. 62/683,600 by ZHANG, et al., entitled "TRANSMISSION PREEMPTION IN MULTI-TRP OPERATION," filed Jun. 11, 2018, assigned to the assignee hereof, and expressly incorporated by reference herein.

BACKGROUND

The following relates generally to wireless communications, and more specifically to transmission preemption in multi-TRP operation.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, one or more base stations may act as or utilize one or more transmission/reception points (TRPs) to transmit information to a UE. Multiple TRPs may jointly transmit information (e.g., as a transport block (TB)) to a UE. In some cases, one of the TRPs may puncture a portion of a jointly transmitted TB with a second downlink communication (e.g., ultra-reliable low-latency communication (URLLC)), which may result in a mismatched transmission between the TRPs, channel distortion, and reception errors at the UE receiving the joint transmission.

SUMMARY

The described techniques relate to improved methods, systems, devices, and apparatuses that support transmission preemption in multi-transmission/reception point (TRP) operation. Generally, the described techniques provide for transmitting unique demodulation reference signals (DMRSs) for channel estimation and preemption indications (PIs) to signal the utilization of unique DMRSs or the lack of utilization of punctured resource elements (REs). In a wireless communications system, multiple TRPs may perform a joint transmission to a user equipment (UE). The UE may rely on DMRSs from the TRPs for channel estimation and data demodulation to receive the joint transmission. In some cases, some REs of a jointly transmitted transport block (TB) may be transmitted by a first TRP and punctured by a second TRP. In such cases, the UE may rely on a DMRS that is unique to the first TRP to receive those punctured REs of the TB. The DMRS that is unique to the first TRP may be provided to the UE during a scheduled DMRS transmission to the UE or as part of the punctured REs. In other cases, a first TRP may, upon determining that a set of REs in a jointly transmitted TB is to be punctured by a second TRP, determine to refrain from transmitting downlink communications on the set of punctured REs. Further, TRPs may transmit PIs to indicate to the UE which REs utilized by the TRPs are to be punctured during downlink communications. A UE may determine which DMRS to utilize for channel estimation (e.g., or whether to ignore punctured REs) based on received PIs.

A method of wireless communication at a UE is described. The method may include receiving a grant for a TB including a set of resource elements, receiving a first DMRS and a second DMRS, where the first DMRS is specific to a first TRP, and the second DMRS is specific to one or more of: a second TRP or a combination of the first TRP and the second TRP, receiving, based on the first DMRS, a transmission from the first TRP of a first portion of the resource elements, and receiving, based on the second DMRS, a joint transmission of a second portion of the resource elements from the first TRP and the second TRP.

An apparatus for wireless communication at a UE is described. The apparatus may include a processor, memory in electronic communication with the processor, and instructions stored in the memory. The instructions may be executable by the processor to cause the apparatus to receive a grant for a TB including a set of resource elements, receive a first DMRS and a second DMRS, where the first DMRS is specific to a first TRP, and the second DMRS is specific to one or more of: a second TRP or a combination of the first TRP and the second TRP, receive, based on the first DMRS, a transmission from the first TRP of a first portion of the resource elements, and receive, based on the second DMRS, a joint transmission of a second portion of the resource elements from the first TRP and the second TRP.

Another apparatus for wireless communication at a UE is described. The apparatus may include means for receiving a grant for a TB including a set of resource elements, receiving a first DMRS and a second DMRS, where the first DMRS is specific to a first TRP, and the second DMRS is specific to one or more of: a second TRP or a combination of the first TRP and the second TRP, receiving, based on the first DMRS, a transmission from the first TRP of a first portion of the resource elements, and receiving, based on the second DMRS, a joint transmission of a second portion of the resource elements from the first TRP and the second TRP.

A non-transitory computer-readable medium storing code for wireless communication at a UE is described. The code may include instructions executable by a processor to receive a grant for a TB including a set of resource elements, receive a first DMRS and a second DMRS, where the first DMRS is specific to a first TRP, and the second DMRS is specific to one or more of: a second TRP or a combination of the first TRP and the second TRP, receive, based on the first DMRS, a transmission from the first TRP of a first portion of the resource elements, and receive, based on the second DMRS, a joint transmission of a second portion of the resource elements from the first TRP and the second TRP.

Some examples of the method, apparatuses, and non-transitory computer-readable medium described herein may further include operations, features, means, or instructions for demultiplexing the first DMRS and the second DMRS from an orthogonal frequency domain multiplexing (OFDM) symbol when the first DMRS and the second DMRS are received during the same OFDM symbol.

Some examples of the method, apparatuses, and non-transitory computer-readable medium described herein may further include operations, features, means, or instructions for spatial multiplexing, frequency domain multiplexing, or code domain multiplexing.

Some examples of the method, apparatuses, and non-transitory computer-readable medium described herein may further include operations, features, means, or instructions for obtaining a combined channel estimate for the first TRP and the second TRP using the first DMRS and the second DMRS and where receiving the joint transmission of the second portion of the resource elements may be based on the combined channel estimate.

In some examples of the method, apparatuses, and non-transitory computer-readable medium described herein, receiving the first DMRS may include operations, features, means, or instructions for receiving from the first TRP a first OFDM symbol of the first portion of the resource elements, the first symbol including the first DMRS.

In some examples of the method, apparatuses, and non-transitory computer-readable medium described herein, receiving the first portion of the resource elements of the TB may include operations, features, means, or instructions for receiving from the first TRP one or more symbols subsequent to the first symbol of the first portion of the resource elements, the one or more symbols subsequent to the first symbol of the first portion of the resource elements including data of the TB.

Some examples of the method, apparatuses, and non-transitory computer-readable medium described herein may further include operations, features, means, or instructions for receiving a first PI message indicating that the first portion of the resource elements may be punctured by the second TRP.

Some examples of the method, apparatuses, and non-transitory computer-readable medium described herein may further include operations, features, means, or instructions for receiving a second PI message indicating that a third portion of the resource elements of the TB may be punctured by the first TRP.

Some examples of the method, apparatuses, and non-transitory computer-readable medium described herein may further include operations, features, means, or instructions for receiving the third portion of the resource elements of the TB using one or more of: the second DMRS or a third DMRS specific to the second TRP.

In some examples of the method, apparatuses, and non-transitory computer-readable medium described herein, the first TRP, the second TRP, or a combination thereof.

In some examples of the method, apparatuses, and non-transitory computer-readable medium described herein, the first PI message further indicates that a third portion of the resource elements of the TB may be punctured by the first TRP.

In some examples of the method, apparatuses, and non-transitory computer-readable medium described herein, the first TRP, the second TRP, or a combination thereof.

A method of wireless communication at a UE is described. The method may include receiving a grant for a TB including a set of resource elements, receiving a DMRS specific to a combination of a first TRP and a second TRP, identifying a first portion of the resource elements associated with puncturing by the first TRP or the second TRP, and receiving, based on the DMRS, a joint transmission of a second portion of the resource elements from the first TRP and the second TRP, where the first portion of the resource elements and the second portion of the resource elements are non-overlapping.

An apparatus for wireless communication at a UE is described. The apparatus may include a processor, memory in electronic communication with the processor, and instructions stored in the memory. The instructions may be executable by the processor to cause the apparatus to receive a grant for a TB including a set of resource elements, receive a DMRS specific to a combination of a first TRP and a second TRP, identify a first portion of the resource elements associated with puncturing by the first TRP or the second TRP, and receive, based on the DMRS, a joint transmission of a second portion of the resource elements from the first TRP and the second TRP, where the first portion of the resource elements and the second portion of the resource elements are non-overlapping.

Another apparatus for wireless communication at a UE is described. The apparatus may include means for receiving a grant for a TB including a set of resource elements, receiving a DMRS specific to a combination of a first TRP and a second TRP, identifying a first portion of the resource elements associated with puncturing by the first TRP or the second TRP, and receiving, based on the DMRS, a joint transmission of a second portion of the resource elements from the first TRP and the second TRP, where the first portion of the resource elements and the second portion of the resource elements are non-overlapping.

A non-transitory computer-readable medium storing code for wireless communication at a UE is described. The code may include instructions executable by a processor to receive a grant for a TB including a set of resource elements, receive a DMRS specific to a combination of a first TRP and a second TRP, identify a first portion of the resource elements associated with puncturing by the first TRP or the second TRP, and receive, based on the DMRS, a joint transmission of a second portion of the resource elements from the first TRP and the second TRP, where the first portion of the resource elements and the second portion of the resource elements are non-overlapping.

In some examples of the method, apparatuses, and non-transitory computer-readable medium described herein, identifying the first portion of the resource elements may include operations, features, means, or instructions for receiving a PI message indicating the first portion of the resource elements.

In some examples of the method, apparatuses, and non-transitory computer-readable medium described herein, receiving the joint transmission of the second portion of the resource elements may include operations, features, means, or instructions for ignoring the first portion of the resource elements.

A method of wireless communication is described. The method may include transmitting a grant for a TB including a set of resource elements, transmitting a first DMRS from a first TRP according to a multiplexing scheme between the first DMRS and a second DMRS from a second TRP, where the first DMRS is specific to the first TRP and the second DMRS is specific to one or more of: a second TRP or a combination of the first TRP and the second TRP, transmitting, by the first TRP based on the first DMRS, a first portion of the resource elements, and performing, by the first TRP based on the second DMRS, a joint transmission with the second TRP of a second portion of the resource elements.

An apparatus for wireless communication is described. The apparatus may include a processor, memory in electronic communication with the processor, and instructions stored in the memory. The instructions may be executable by the processor to cause the apparatus to transmit a grant for a TB including a set of resource elements, transmit a first DMRS from a first TRP according to a multiplexing scheme between the first DMRS and a second DMRS from a second TRP, where the first DMRS is specific to the first TRP and the second DMRS is specific to one or more of: a second TRP or a combination of the first TRP and the second TRP, transmit, by the first TRP based on the first DMRS, a first portion of the resource elements, and perform, by the first TRP based on the second DMRS, a joint transmission with the second TRP of a second portion of the resource elements.

Another apparatus for wireless communication is described. The apparatus may include means for transmitting a grant for a TB including a set of resource elements, transmitting a first DMRS from a first TRP according to a multiplexing scheme between the first DMRS and a second DMRS from a second TRP, where the first DMRS is specific to the first TRP and the second DMRS is specific to one or more of: a second TRP or a combination of the first TRP and the second TRP, transmitting, by the first TRP based on the first DMRS, a first portion of the resource elements, and performing, by the first TRP based on the second DMRS, a joint transmission with the second TRP of a second portion of the resource elements.

A non-transitory computer-readable medium storing code for wireless communication is described. The code may include instructions executable by a processor to transmit a grant for a TB including a set of resource elements, transmit a first DMRS from a first TRP according to a multiplexing scheme between the first DMRS and a second DMRS from a second TRP, where the first DMRS is specific to the first TRP and the second DMRS is specific to one or more of: a second TRP or a combination of the first TRP and the second TRP, transmit, by the first TRP based on the first DMRS, a first portion of the resource elements, and perform, by the first TRP based on the second DMRS, a joint transmission with the second TRP of a second portion of the resource elements.

In some examples of the method, apparatuses, and non-transitory computer-readable medium described herein, transmitting the first DMRS may include operations, features, means, or instructions for transmitting a first symbol of the first portion of the resource elements, the first symbol including the first DMRS.

In some examples of the method, apparatuses, and non-transitory computer-readable medium described herein, transmitting the first portion of the resource elements of the TB may include operations, features, means, or instructions for transmitting one or more symbols subsequent to the first symbol of the first portion of the resource elements, the one or more symbols subsequent to the first symbol of the first portion of the resource elements including data of the TB.

Some examples of the method, apparatuses, and non-transitory computer-readable medium described herein may further include operations, features, means, or instructions for transmitting a first PI message indicating that the first portion of the resource elements may be punctured by the second TRP.

Some examples of the method, apparatuses, and non-transitory computer-readable medium described herein may further include operations, features, means, or instructions for transmitting a second PI message indicating that a third portion of the resource elements of the TB may be punctured by the first TRP.

In some examples of the method, apparatuses, and non-transitory computer-readable medium described herein, the first PI message further indicates that a third portion of the resource elements of the TB may be punctured by the first TRP.

A method of wireless communication is described. The method may include transmitting to a UE a grant for a TB including a set of resource elements, transmitting a DMRS specific to a combination of a first TRP and a second TRP, identifying a first portion of the resource elements associated with puncturing by the second TRP, refraining from transmitting from the first TRP to the UE during the first portion of the resource elements, and performing, by the first TRP, a joint transmission with the second TRP of a second portion of the resource elements, where the first portion of the resource elements and the second portion of the resource elements are non-overlapping.

An apparatus for wireless communication is described. The apparatus may include a processor, memory in electronic communication with the processor, and instructions stored in the memory. The instructions may be executable by the processor to cause the apparatus to transmit to a UE a grant for a TB including a set of resource elements, transmit a DMRS specific to a combination of a first TRP and a second TRP, identify a first portion of the resource elements associated with puncturing by the second TRP, refrain from transmitting from the first TRP to the UE during the first portion of the resource elements, and perform, by the first TRP, a joint transmission with the second TRP of a second portion of the resource elements, where the first portion of the resource elements and the second portion of the resource elements are non-overlapping.

Another apparatus for wireless communication is described. The apparatus may include means for transmitting to a UE a grant for a TB including a set of resource elements, transmitting a DMRS specific to a combination of a first TRP and a second TRP, identifying a first portion of the resource elements associated with puncturing by the second TRP, refraining from transmitting from the first TRP to the UE during the first portion of the resource elements, and performing, by the first TRP, a joint transmission with the second TRP of a second portion of the resource elements, where the first portion of the resource elements and the second portion of the resource elements are non-overlapping.

A non-transitory computer-readable medium storing code for wireless communication is described. The code may include instructions executable by a processor to transmit to a UE a grant for a TB including a set of resource elements, transmit a DMRS specific to a combination of a first TRP and a second TRP, identify a first portion of the resource elements associated with puncturing by the second TRP, refrain from transmitting from the first TRP to the UE during the first portion of the resource elements, and perform, by the first TRP, a joint transmission with the second TRP of a second portion of the resource elements, where the first portion of the resource elements and the second portion of the resource elements are non-overlapping.

Some examples of the method, apparatuses, and non-transitory computer-readable medium described herein may further include operations, features, means, or instructions for transmitting a PI message indicating the first portion of the resource elements.

DETAILED DESCRIPTION

Figure 1:
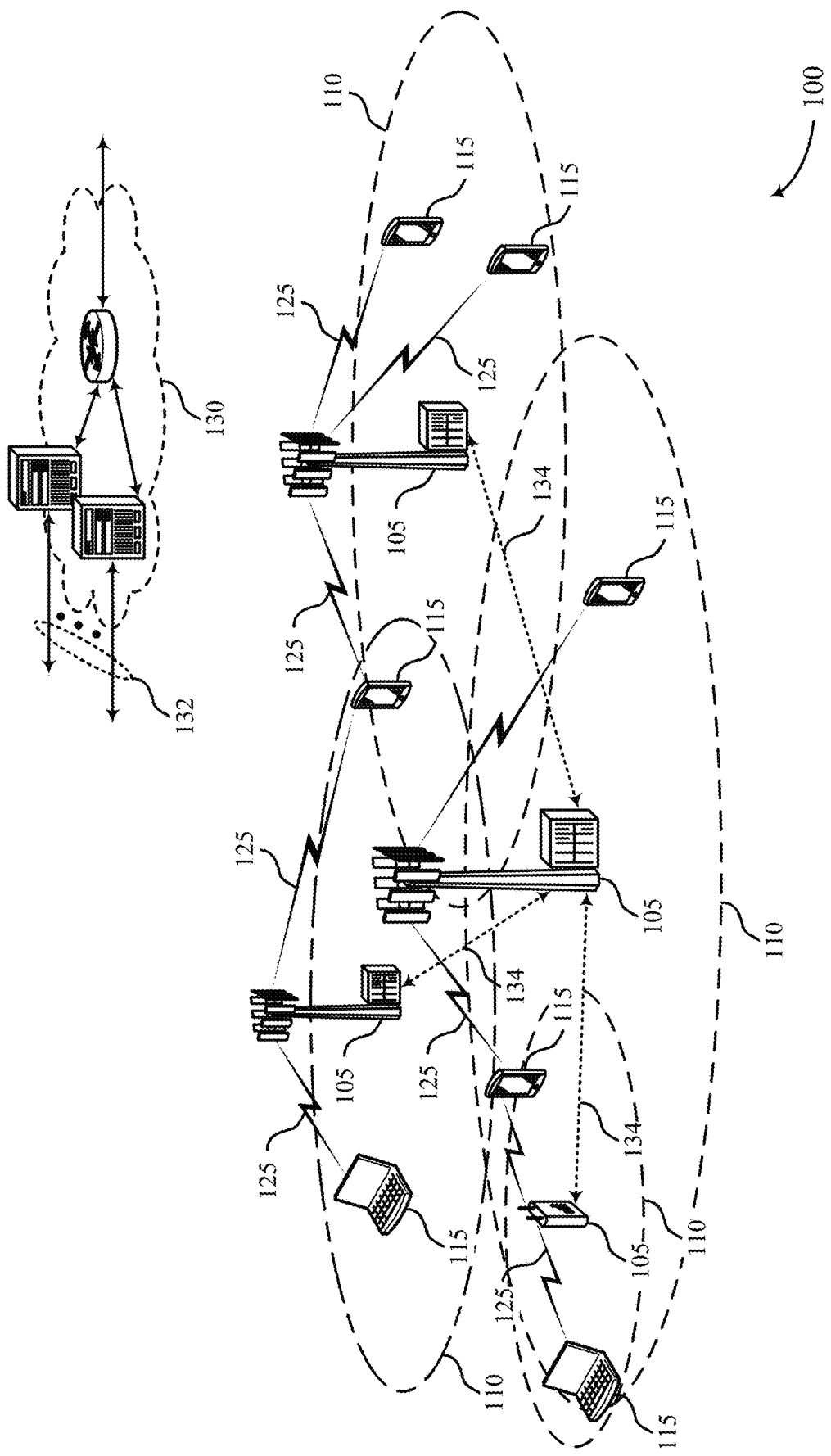
FIGS. 1 and 2 illustrate examples of wireless communications systems that support transmission preemption in multi-transmission/reception point (TRP) operation in accordance with aspects of the present disclosure.

The described techniques relate to preemption in multi-TRP operation. In wireless communications systems, one or more base stations may act as or utilize one or more transmission/reception points (TRPs) to jointly transmit information (e.g., as a transport block) to a user equipment (UE). One of the TRPs may puncture a portion of a jointly transmitted TB with a second downlink communication (e.g., an ultra-reliable low-latency communication (URLLC)), which may result in channel detection and estimation errors at the UE receiving the joint transmission. In accordance with aspects of the present disclosure, one or more TRPs may transmit unique demodulation reference signals (DMRSs) for channel estimation at a user equipment (UE) and preemption indications (PIs) to signal the utilization of unique DMRSs or the lack of utilization of punctured resource elements (REs).

In some cases, one or more TRPs may transmit unique DMRSs such that each TRP transmits a DMRS that is unique to the transmitting TRP. When one TRP punctures REs of a jointly transmitted TB, a UE may utilize the unique DMRS from a non-puncturing TRP for channel estimation on the punctured REs. In other cases, one or more TRPs may transmit DMRSs that are unique to REs which are punctured by one or more other TRPs. For example, a first TRP may transmit a unique DMRS on the REs that are punctured by a second TRP, which may aid a receiving UE during channel estimation on the punctured REs. In cases where one or more TRPs jointly transmit DMRS, a first TRP may determine to refrain from transmitting on REs that are punctured by a second TRP, which may prevent the unnecessary utilization of time-frequency resources on the undetectable or unencodable punctured REs.

In some examples, one or more TRPs may transmit one or more PIs to a UE, which may indicate the REs that are punctured or not utilized by the respective TRPs. For example, when a TRP punctures a set of REs, the TRP may transmit a PI to a receiving UE to indicate the REs that are to be punctured. The receiving UE may determine to utilize a TRP-unique DMRS or a punctured RE-unique DMRS for channel estimation, or the receiving UE may determine to ignore the punctured (e.g., or not utilized) REs based on the PI. In some cases, one or more TRPs may transmit PIs that indicate the punctured (e.g., or not-utilized) REs of the one or more TRPs, which may minimize PI signaling overhead at the TRPs and monitoring complexity at receiving UEs. For example, a first TRP may transmit a first PI that indicates both the REs that are to be punctured (e.g., or not utilized) by the first TRP and the REs that are to be punctured (e.g., or not utilized) by a second TRP.

In some cases, one or more TRPs may transmit one or more joint PIs to a UE, which may indicate the REs that are punctured or not utilized by the one or more TRPs. In an example of a wireless communications system that includes two TRPs, a first TRP may transmit a joint PI to a receiving UE that indicates the REs that are to be punctured (e.g., or not utilized) by the first TRP and a second TRP. The receiving UE may determine to utilize a TRP-unique DMRS or a punctured RE-unique DMRS for channel estimation, or the receiving UE may determine to ignore the punctured REs based on the PI. When multiple TRPs transmit joint PIs, the monitoring complexity at receiving UEs may be minimized. In some cases, the joint PIs may not include information that indicates which TRP is puncturing the indicated REs.

Aspects of the disclosure are initially described in the context of wireless communications systems. Aspects of the disclosure are then illustrated by and described with reference to RE configurations and a process flow. Aspects of the disclosure are further illustrated by and described with reference to apparatus diagrams, system diagrams, and flowcharts that relate to transmission preemption in multi-TRP operation.

FIG. 1 illustrates an example of a wireless communications system 100 that supports transmission preemption in multi-TRP operation in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data.

In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling.

A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, or NR). For example, communications over a carrier may be organized according to TTIs or slots, each of which may include user data as well as control information or signaling to support decoding the user data. A carrier may also include dedicated acquisition signaling (e.g., synchronization signals or system information) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more REs that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, or 80 MHz) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some wireless communications systems, one or more base stations 105 may act as or utilize one or more TRPs to transmit information to a UE 115. Multiple TRPs may jointly transmit information (e.g., as a TB) to a UE 115. In some cases, one of the TRPs may puncture a portion of a jointly transmitted TB with a second downlink communication (e.g., URLLC), which may result in a mismatched transmission between the TRPs, channel distortion, and reception errors at the UE receiving the joint transmission.

Figure 2:
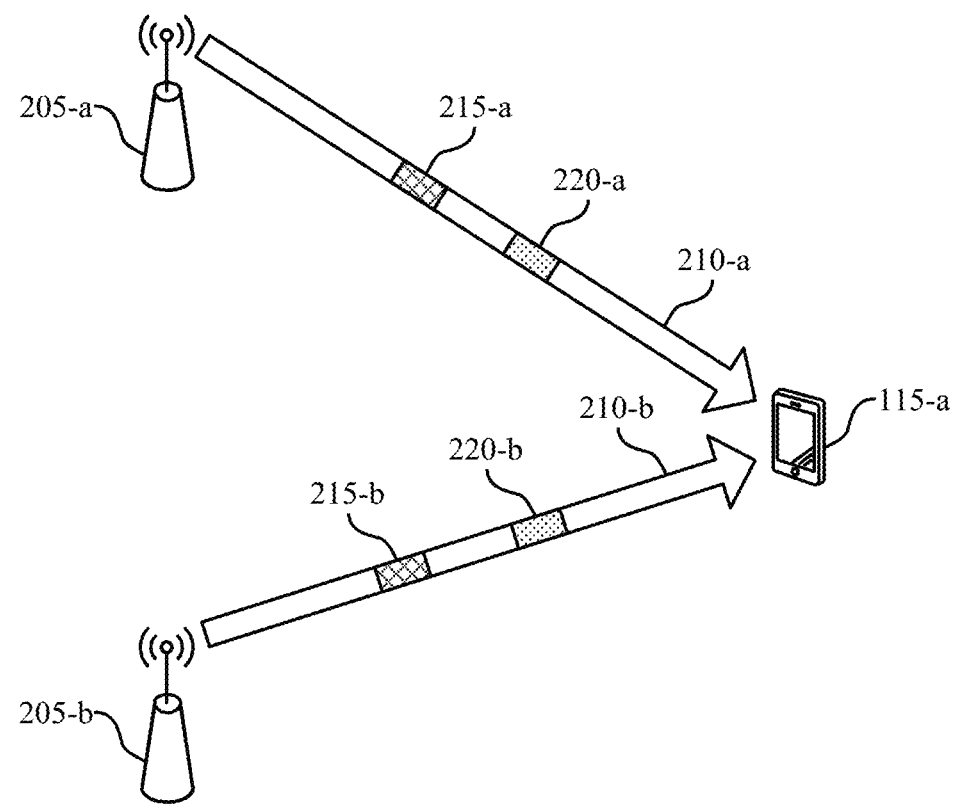

In some cases, a UE 115 may rely on a DMRS that is unique to a first TRP to receive punctured REs of a TB. The DMRS that is unique to the first TRP may be provided to the UE 115 during a scheduled DMRS transmission to the UE 115 or as part of the punctured REs. In other cases, a first TRP may, upon determining that a set of REs in a jointly transmitted TB is to be punctured by a second TRP, determine to refrain from transmitting downlink communications on the set of punctured REs. Further, TRPs may transmit PIs to indicate to the UE 115 which REs utilized by the TRPs are to be punctured during downlink communications. A UE 115 may determine which DMRS to utilize for channel estimation (e.g., or whether to ignore punctured REs) based on received PIs FIG. 2 illustrates an example of a wireless communications system 200 that supports transmission preemption in multi-TRP operation in accordance with aspects of the present disclosure. In some examples, wireless communications system 200 may implement aspects of wireless communications system 100. Wireless communications system 200 may include TRPs 205 which may transmit downlink communications 210 (e.g., downlink communications 210-a and downlink communications 210-b) to UE 115-a. TRPs 205 may be collocated in some cases, and in other cases TRPs 205 may not be collocated. TRPs 205 may be associated with the same cell or base station in some cases, and in other cases TRPs 205 may be associated with different cells or base stations. Downlink communications 210 may include a data transport block (TB) 215 and a PI 220. Multiple TRPs 205 may utilize the same time-frequency resources for downlink communications 210 such that UE 115-a may combine the different downlink communications 210 upon reception In some cases, TRP 205-a and TRP 205-b may transmit TB 215-a and TB 215-b, respectively, to UE 115-a in a joint manner. In such cases, UE 115-a may rely on DMRSs from TRP 205-a and TRP 205-b for channel estimation and data demodulation to receive the joint transmission. When some REs of TBs 215 are punctured by a first TRP 205 (e.g., TRP 205-b), UE 115-a may utilize a DMRS that is unique to a second TRP (e.g., TRP 205-a) to receive the punctured REs on TBs 215.

In some cases, TRP 205-a and TRP 205-b may each transmit a DMRS that is unique to the respective transmitting TRP 205, which may be combined by UE 115-a to obtain a combined channel estimation for the TRPs 205. Because each DMRS may be unique to each TRP 205, UE 115-a may individually obtain a channel estimation for each TRP 205 when a TB 215 is expected to be punctured. For example, TRP 205-b may puncture TB 215-b, which may cause UE 115-a to utilize the DMRS that is unique to TRP 205-a when performing channel estimation for TB 215-b. In some cases, the unique DMRS of TB 215-a and TB 215-b may be transmitted during the same symbol period such that UE 115-a may multiplex the transmissions upon reception (e.g., using spatial multiplexing, frequency domain multiplexing, or code domain multiplexing).

In other cases, TRP 205-a and TRP 205-b may transmit a joint DMRS for TB 215-a and TB 215-b while transmitting unique DMRS for punctured REs. Both TRP 205-a and TRP 205-b may transmit the joint DMRS during the same symbol period of TB 215-a and TB 215-b, respectively, such that a combined channel estimation may be determined by UE 115-a. When TB 215-b is expected to be punctured during a first set of REs, for example, TRP 205-a may transmit a unique DMRS on the first set of REs of TB 215-a such that UE 115-a may perform channel estimation for the punctured REs, which may allow UE 115-a to detect and demodulate the transmissions on the punctured REs.

In some cases, TRPs 205 utilize a joint DMRS for channel estimation such that when a first TRP 205 punctures a set of REs, the punctured REs may become undetectable or unencodable at UE 115-a, which may cause a second TRP 205 to determine to puncture (e.g., or refrain from transmitting on) the set of punctured REs. For example, when TB 205-a and TB 205-b transmit a joint DMRS and TRP 205-b punctures a set of REs within TB 215-b, TRP 205-a may puncture (e.g., or refrain from transmitting on) the same set of REs within TB 215-a, thus avoiding wasting transmission resources on undetectable communications and introducing unnecessary interference to other UEs in the system.

In some cases, each TRP 205 may transmit individual PIs 220 for the TBs 215 that correspond with the transmitting TRP 205. For example, TRP 205-a may transmit PI 220-a to indicate the punctured REs on TB 215-a, and TRP 205-b may transmit PI 220-b to indicate the punctured REs on TB 215-b. In the example when TRP 205-a and TRP 205-b utilize unique DMRS in TB 215-a and TB 215-b, respectively, and TB 215-b expects to be punctured, TRP 215-b may transmit PI 220-b to indicate the upcoming puncturing to UE 115-a, which may allow UE 115-a to successfully obtain a channel estimation of TB 215-b by utilizing the DMRS that is unique to TB 215-a. In the example of TRP 205-a transmitting a unique DMRS on the REs that are punctured by TRP 205-b, TRP 205-a may transmit PI 220-a to UE 115-a, which may indicate the transmission of the unique DMRS within TB 215-a, and TRP 205-b may transmit PI 220-b to UE 115-a, which may indicate the punctured REs of TB 215-b. These PIs may allow UE 115-a to successfully obtain a channel estimation of the punctured REs of TB 215-b by utilizing the unique DMRS that is transmitted on the unpunctured REs of TB 215-a. In the example of TRP 205-a and TRP 205-b refraining from transmitting on punctured REs, TRP 205-a and TRP 205-b may transmit PI 220-a and PI 220-b, respectively, to UE 115-a, which may indicate the REs that are being punctured (e.g., or not utilized) by TRP 205-a and TRP 205-b. Based on PI 220-a and PI 220-b, UE 115-a may determine to ignore downlink transmissions on the punctured (e.g., or not utilized) REs.

In some examples, multiple PIs 220 may be transmitted from a single TRP 205. For example, TRP 205-a may transmit PI 220-a and PI 220-b on downlink communications 210-a, where PI 220-a may indicate punctured (e.g., or not utilized) REs on TB 215-a or the transmission of a unique DMRS within TB 215-a, and PI 220-b may indicate punctured (e.g., or not utilized) REs on TB 215-b or the transmission of a unique DMRS within TB 215-b. When multiple PIs 220 are transmitted from a single TRP 205, UE 115-a may monitor only one TRP 205, which may reduce the complexity of monitoring for PIs 220 at UE 115-a.

In other examples, multiple PIs 220 may be transmitted from each TRP 205. For example, TRP 205-a may transmit PI 220-a and PI 220-b using downlink communication 210-a and TRP 205-b may transmit PI 220-a and PI 220-b using downlink communication 210-b, where PI 220-a may indicate punctured (e.g., or not utilized) REs on TB 215-a or the transmission of a unique DMRS within TB 215-a, and PI 220-b may indicate punctured (e.g., or not utilized) REs on TB 215-b or the transmission of a unique DMRS within TB 215-b. When multiple PIs 220 are transmitted from a plurality of the one or more TRPs 205 of wireless communications system 200 (e.g., TRP 205-a and TRP 205-b), UE 115-a may obtain the PIs 220 from whichever TRP 205 transmits the PIs 220 sooner, which may increase the effectiveness of the utilization of the PIs 220 at UE 115-a.

In some cases, one TRP 205 (e.g., TRP 205-a) may transmit a joint PI 220 to indicate the punctured (e.g., or muted) REs on all TBs 215 of wireless communications system 200. When TB 215-a and TB 215-b include DMRS that are unique to each TB 215, a single TRP 205 may transmit a joint PI 220 which may indicate the REs that are punctured on the TBs 215. For example, TRP 205-a may transmit PI 220-a to UE 115-a using downlink communications 210-*a* to explicitly signal to UE 115-*a* which REs of TB 215-*a* are punctured (e.g., or not utilized) and which REs of TB 215-*b* are punctured (e.g., or not utilized). In some cases, UE 115-*a* may determine to ignore communications on the REs that are punctured (e.g., or not utilized) within TB 215-*a* and TB 215-*b* based on PI 220-*a*. When TB 215-*a* and TB 215-*b* include a joint DMRS, a single TRP 205 may transmit a PI 220 to indicate the total set of REs punctured (e.g., or not utilized) on both TBs 215. In some cases, this indication may not explicitly signal which TRP 205 corresponds to the punctured REs. For example, TRP 205-*a* may transmit PI 220-*a* using downlink communications 210 to UE 115-*a* such that PI 220-*a* indicates the REs that are punctured (e.g., or not utilized) within TB 215-*a* and TB 215-*b* without indicating with which TB 215 the punctured REs are associated. Upon receiving such a PI, UE 115-*a* may determine to utilize DMRS that are unique to the punctured REs for channel estimation.

In some examples, a joint PI 220 may be transmitted from a single TRP 205. For example, TRP 205-*a* may transmit PI 220-*a* using downlink communications 210-*a*, where PI 220-*a* may indicate one or more of the punctured (e.g., or not utilized) REs on TB 215-*a*, the transmission of a unique DMRS within TB 215-*a*, the punctured (e.g., or not utilized) REs on TB 215-*b*, or the transmission of a unique DMRS within TB 215-*b*. When a joint PI 220 is transmitted from a single TRP 205, UE 115-*a* may monitor only one TRP 205, which may reduce the complexity of monitoring for PIs 220 at UE 115-*a*.

In other examples, multiple joint PIs 220 may be transmitted from each TRP 205. For example, TRP 205-*a* may transmit PI 220-*a* using downlink communications 210-*a* and TRP 205-*b* may transmit PI 220-*a* and PI 220-*b* using downlink communications 210-*b*, where PI 220-*a* and PI 220-*b* may be joint PIs 220 as described above. When multiple joint PIs 220 are transmitted from a plurality of the one or more TRPs 205 of wireless communications system 200 (e.g., TRP 205-*a* and TRP 205-*b*), UE 115-*a* may obtain the PIs 220 from whichever TRP 205 transmits the PIs 220 sooner, which may increase the effectiveness of the utilization of the PIs 220 at UE 115-*a*. Further, transmitting multiple joint PIs 220 may increase the reliability at which UE 115-*a* receives the PIs 220.

Figure 3:
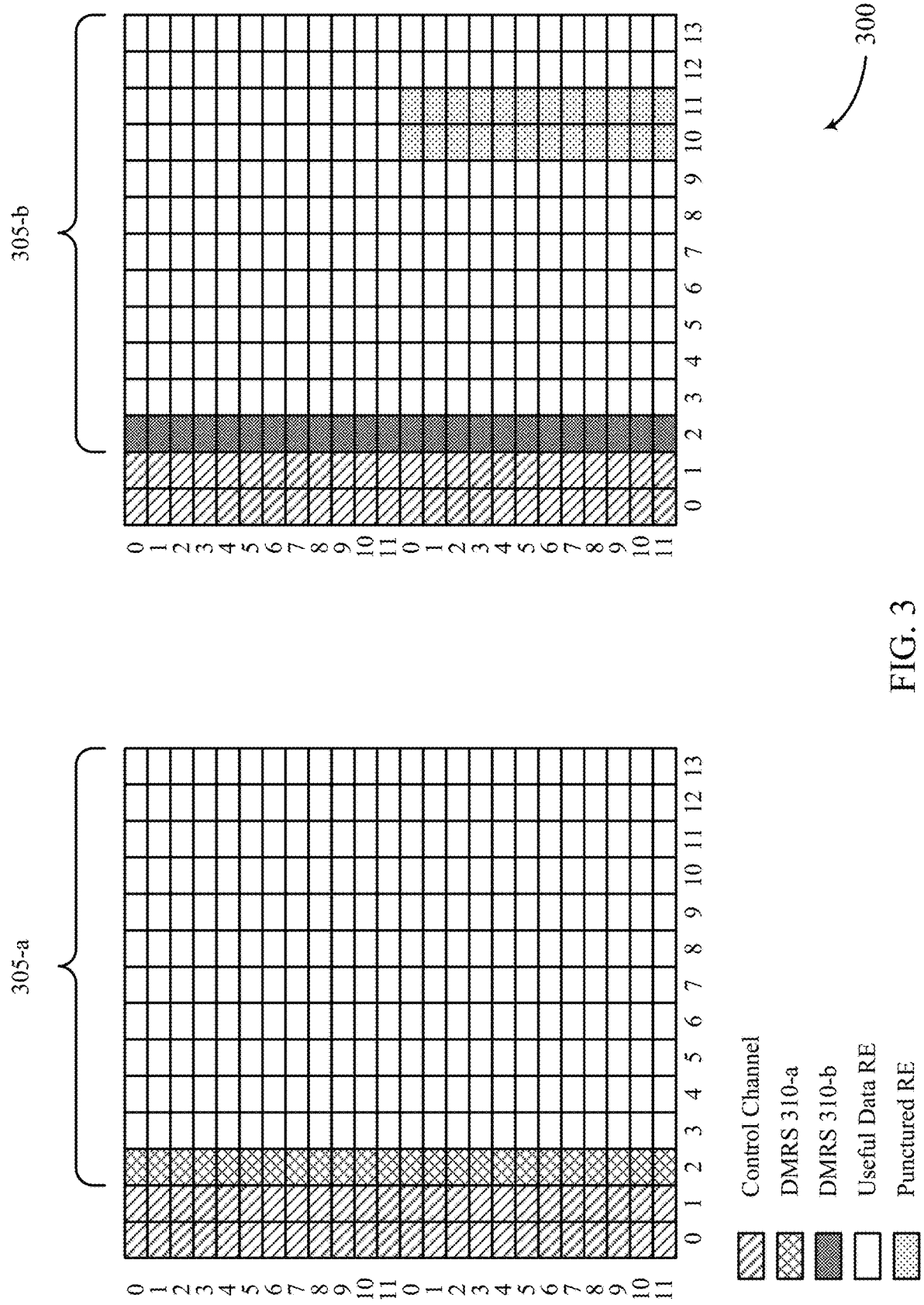
FIGS. 3 through 5 illustrate examples of resource element (RE) configurations that support transmission preemption in multi-TRP operation in accordance with aspects of the present disclosure.

FIG. 3 illustrates an example of an RE configuration 300 that supports transmission preemption in multi-TRP operation in accordance with aspects of the present disclosure. In some examples, RE configuration 300 may implement aspects of wireless communications system 100 and 200. RE configuration 300 may include REs that may be utilized by TRPs to transmit downlink communications (e.g., which may include TBs 305) to UEs 115. In some cases, TB 305-*a* may be transmitted by a first TRP, and TB 305-*b* may be transmitted by a second TRP. In some examples, a TB 305 may span 24 subchannels (e.g., or tones) in the frequency domain and 12 symbols in the time domain of a slot (e.g., where the slot may be 14 symbols in length). A first portion (e.g., the first two symbols) of a slot may be reserved for control signaling, and a second portion (e.g., the last 12 symbols) of the slot may be configured for a TB 305. In some cases, a portion of a TB 305 may be reserved for DMRS 310 transmission (e.g., the first symbol of a TB 305). The remaining REs of TB 305 may be utilized by a TRP to transmit TBs 305 to a UE 115. In some cases, the REs used to transmit TBs 305 (e.g., TB 305-*a* and TB 305-*b*) may utilize the same time-frequency resources. When different TRPs transmit their own TBs 305, a UE 115 may demultiplex the downlink communications transmitted by the TRPs (e.g., using spatial multiplexing, frequency domain multiplexing, or code domain multiplexing). When multiple TRPs transmit TBs 305 jointly, a UE 115 may attempt to decode the joint TBs 305 across the multiple transmissions from the TRPs.

In some cases, a TRP may puncture a TB 305 (e.g., for ultra-reliable low-latency communications (URLLC)). For example, the 12 lowest-frequency tones of symbols 10 and 11 of TB 305-*b* may be punctured by the second TRP for URLLC transmission. The punctured REs may experience different channel conditions compared to the other data transmitted on TBs 305, which may result in a mismatched channel estimation that may prevent a UE 115 from utilizing the punctured subchannels (e.g., or tones) of TBs 305 for communication. In some examples, such as non-transparent transmit diversity (TxD) schemes (e.g., space frequency block coding (SFBC), space time block coding (STBC), or TRP permutation), puncturing REs may increase the complexity of signal detection at a UE 115.

As described above with reference to FIG. 2, TRPs may be configured with individual DMRS 310 such that the TB 305 assigned to each TRP includes a different DMRS 310. For example, the first TRP may transmit DMRS 310-*a* on TB 305-*a*, and the second TRP may transmit DMRS 310-*b* on TB 305-*b*. Accordingly, a UE 115 that receives DMRSs 310 from TRPs may obtain channel estimates for each TRP individually based on the unique DMRS 310. In the cases when TBs 305 are not punctured, a UE 115 may obtain a combined channel estimation from each individual DMRS 310 for data demodulation. When one or more REs of a TB 305 are punctured, a UE 115 may use the channel estimation corresponding to the TB 305 that is not punctured. For example, when TB 305-*b* is punctured, a UE 115 may utilize the channel estimation from DMRS 310-*a* associated with TB 305-*a* when demodulating data for TB 305-*b*. While such a configuration may increase DMRS overhead or reduce the DMRS processing gain, the negative effects that puncturing has on channel estimation and signal detection may be mitigated when configuring unique DMRS 310 for each TRP.

As described above with reference to FIG. 2, one or more TRPs may transmit one or more PIs to a UE 115 to indicate whether TBs 305 are punctured. For example, because TB 305-*a* is not punctured, the first TRP may transmit a PI that indicates that TB 305-*a* is not punctured (e.g., or the first TRP may not transmit a PI, which may implicitly indicate that TB 305-*a* is not punctured). In some examples, when the 12 lowest-frequency tones of symbols 10 and 11 of TB 305-*b* are punctured by the second TRP, the second TRP may transmit a PI that indicates that the 12 lowest-frequency tones of symbols 10 and 11 of TB 305-*b* are punctured. In some cases, a joint PI may be transmitted which may indicate which REs of TBs 305 are punctured with (e.g., or without) an indication of with which TRP the punctured TBs 305 are associated. For example, a joint PI (e.g., transmitted by one or more of the first TRP and the second TRP) may indicate that the 12 lowest-frequency tones of symbols 10 and 11 of TB 305 are punctured, and the joint PI may or may not indicate that the punctured REs are associated with TB 305-*b*.

Such PIs may allow a UE 115 to utilize the correct DMRS 310 for channel estimation and data decoding. For example, when the first TRP transmits a PI to a UE 115 that indicates that TB 305-*a* is not punctured and the second TRP transmits a PI to a UE 115 that indicates that the 12 lowest-frequency tones of symbols 10 and 11 of TB 305-*b* are punctured (e.g., or when a joint PI that indicates the same information is transmitted), the UE 115 may determine to utilize the channel estimation from DMRS 310-*a* associated with TB 305-*a* when demodulating data for TB 305-*b*.

Figure 4:
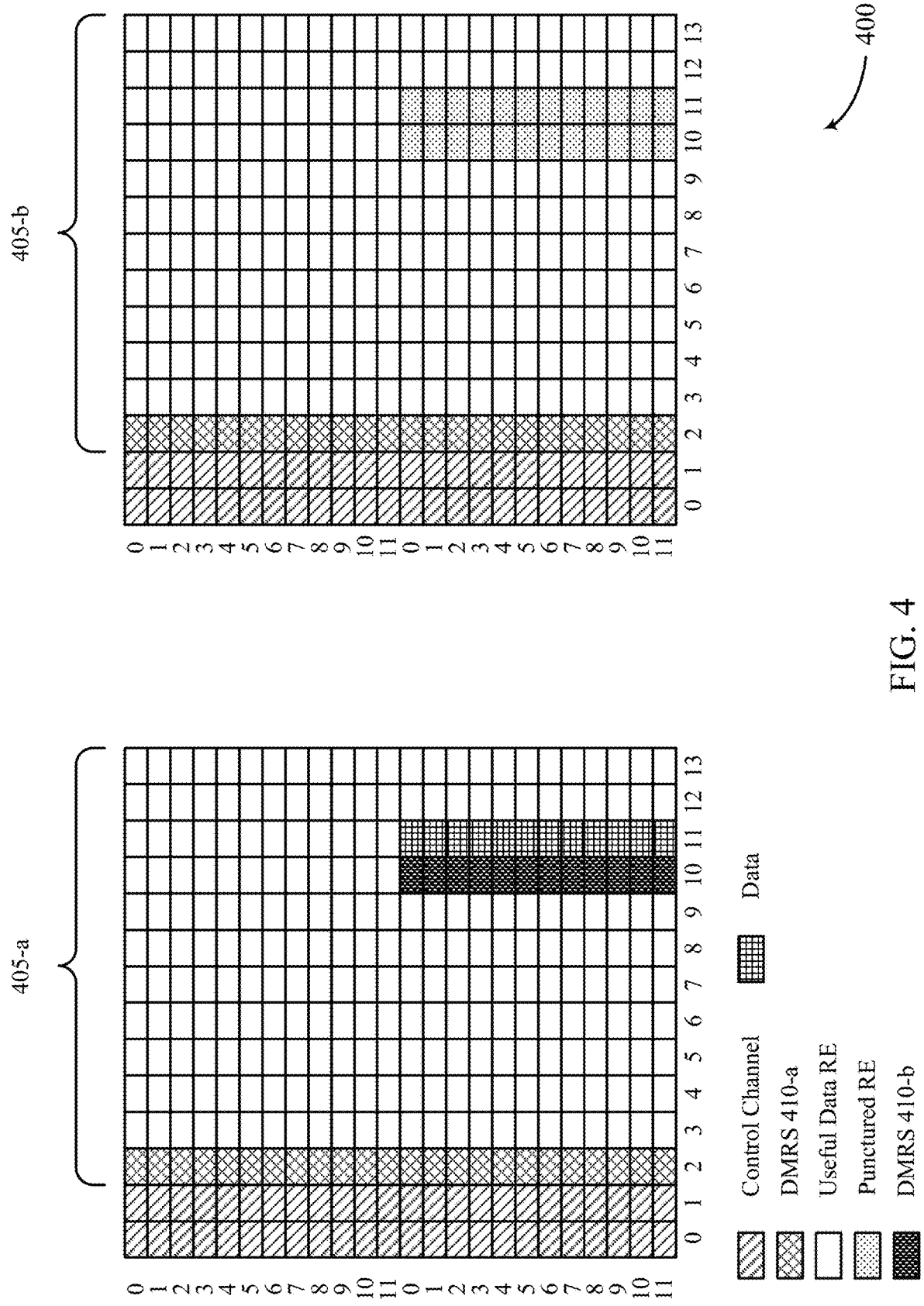

FIG. 4 illustrates an example of an RE configuration 400 that supports transmission preemption in multi-TRP operation in accordance with aspects of the present disclosure. In some examples, RE configuration 400 may implement aspects of wireless communications systems 100 and 200. RE configuration 400 may include REs that may be utilized by TRPs to transmit downlink communications (e.g., which may include TBs 405) to UEs 115. In some cases, TB 405-*a* may be utilized by a first TRP, and TB 405-*b* may be utilized by a second TRP. In some examples, a TB 405 may span 24 subchannels (e.g., or tones) in the frequency domain and 12 symbols in the time domain of a slot (e.g., where the slot may be 14 symbols in length). A first portion (e.g., the first two symbols) of a slot may be reserved for control signaling, and a second portion (e.g., the last 12 symbols) of the slot may be configured for a TB 405. In some cases, a portion of a TB 405 may be reserved for a joint DMRS 410-*a* transmission (e.g., the first symbol of a TB 405). The remaining REs of a TB 405 may be utilized by a TRP to transmit TBs 405 to a UE 115. In some cases, the REs used to transmit TBs 405 (e.g., TB 405-*a* and TB 405-*b*) may utilize the same time-frequency resources. When different TRPs transmit their own TBs 405, a UE 115 may demultiplex the downlink communications transmitted by the TRPs (e.g., using spatial multiplexing, frequency domain multiplexing, or code domain multiplexing). When multiple TRPs transmit TBs 405 jointly, a UE 115 may attempt to decode the joint TBs 405 across the multiple transmissions from the TRPs.

In some cases, a TB 405 may be punctured by the TRP that transmits the TB 405. For example, the 12 lowest-frequency tones of symbols 10 and 11 of TB 405-*b* may be punctured by the second TRP (e.g., for URLLC transmission). The punctured REs may experience different channel conditions compared to the other data transmitted on TB 405-*b*, which may result in a mismatched channel estimation that may prevent a UE 115 from utilizing the punctured subchannels (e.g., or tones) of TB 405-*a* and TB 405-*b* for communication. In some examples, such as non-transparent TxD schemes (e.g., SFBC, STBC, or TRP permutation), puncturing REs may increase the complexity of signal detection at a UE 115.

As described above with reference to FIG. 2, TRPs may be configured to transmit DMRS 410-*b* such that the punctured REs of a first TB 405 are utilized to transmit DMRS 410-*b* on a second TB 405 (i.e., the TB 405 that is not punctured). For example, when the 12 lowest-frequency tones of symbols 10 and 11 of TB 405-*b* are punctured by the second TRP, the first TRP may transmit DMRS 410-*b* on the 12 lowest frequency tones of symbol 10 of TB 405-*a*. DMRS 410-*b* may be utilized by a UE 115 for channel estimation at the punctured subchannels, which may aid in successful detection and demodulation of the punctured subchannels. Once DMRS 410-*b* transmission is complete on TB 405-*a*, the first TRP may resume transmitting data on the 12 lowest frequency tones of symbol 11 of TB 405-*a*. While such a configuration may result in greater DMRS overhead (e.g., due to DMRS 410-*b*) and may require closer coordination between TRPs, transmitting DMRS 410-*b* may prevent increased DMRS overhead due to unique DMRS transmissions for each TRP (as described with reference to FIGS. 2 and 3), and the negative effects that puncturing has on channel estimation and detection may be mitigated.

As described above with reference to FIG. 2, one or more PIs may be transmitted to a UE 115 to indicate whether TBs 405 are punctured. For example, because TB 405-*a* is not punctured, the first TRP may transmit a PI that indicates TB 405-*a* is not punctured (e.g., or the first TRP may not transmit a PI, which may implicitly indicate that TB 405-*a* is not punctured). When the 12 lowest-frequency tones of symbols 10 and 11 of TB 405-*b* are punctured by the second TRP, the second TRP may transmit a PI that indicates that the 12 lowest-frequency tones of symbols 10 and 11 of TB 405-*b* are punctured. In some cases, a joint PI may be transmitted which may indicate which REs of TB 405 are punctured with (e.g., or without) an indication of which TRP the punctured REs are associated with. For example, a joint PI may indicate that the 12 lowest-frequency tones of symbols 10 and 11 of TBs 405 are punctured, and the joint PI may or may not indicate that the punctured REs are associated with TB 405-*b*.

Such PIs may allow a UE 115 to utilize DMRS 410-*b* for channel estimation and data decoding on punctured subchannels. For example, when the first TRP transmits a PI to a UE 115 that indicates that TB 405-*a* is not punctured and the second TRP transmits a PI to a UE 115 that indicates that the 12 lowest-frequency tones of symbols 10 and 11 of TB 405-*b* are punctured (e.g., or when a joint PI that indicates the same information is transmitted), the UE 115 may determine to utilize the channel estimation obtained from DMRS 410-*b* when demodulating data on the punctured subchannels of TBs 405.

Figure 5:
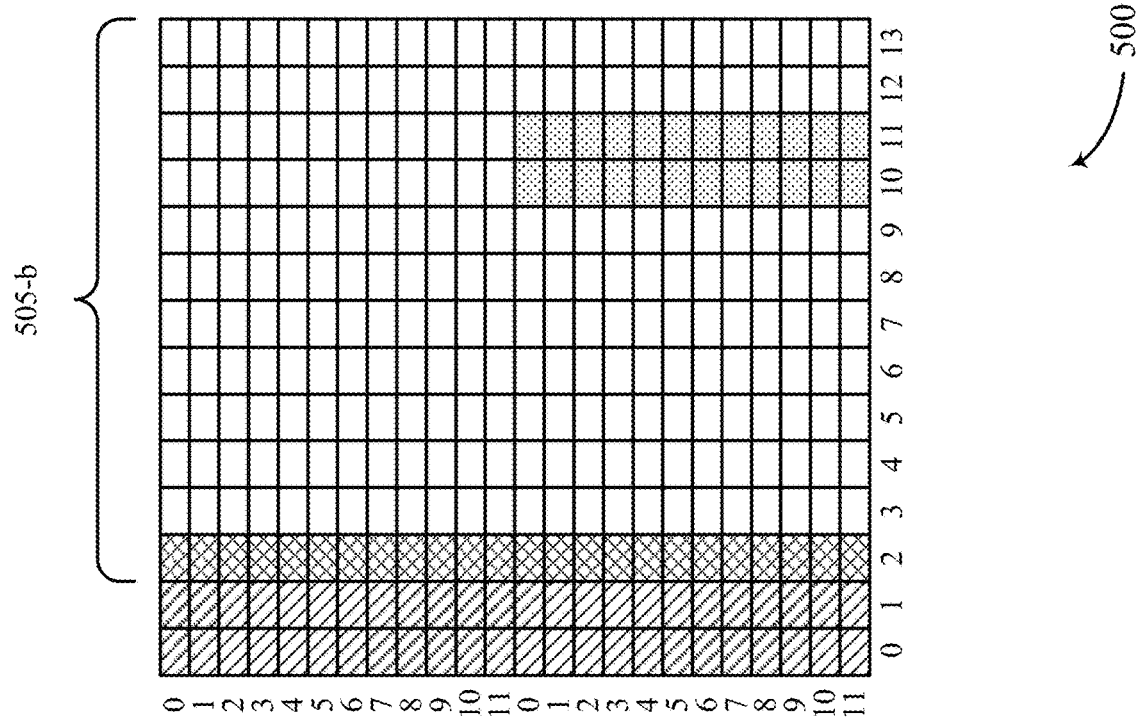
Figure 5:
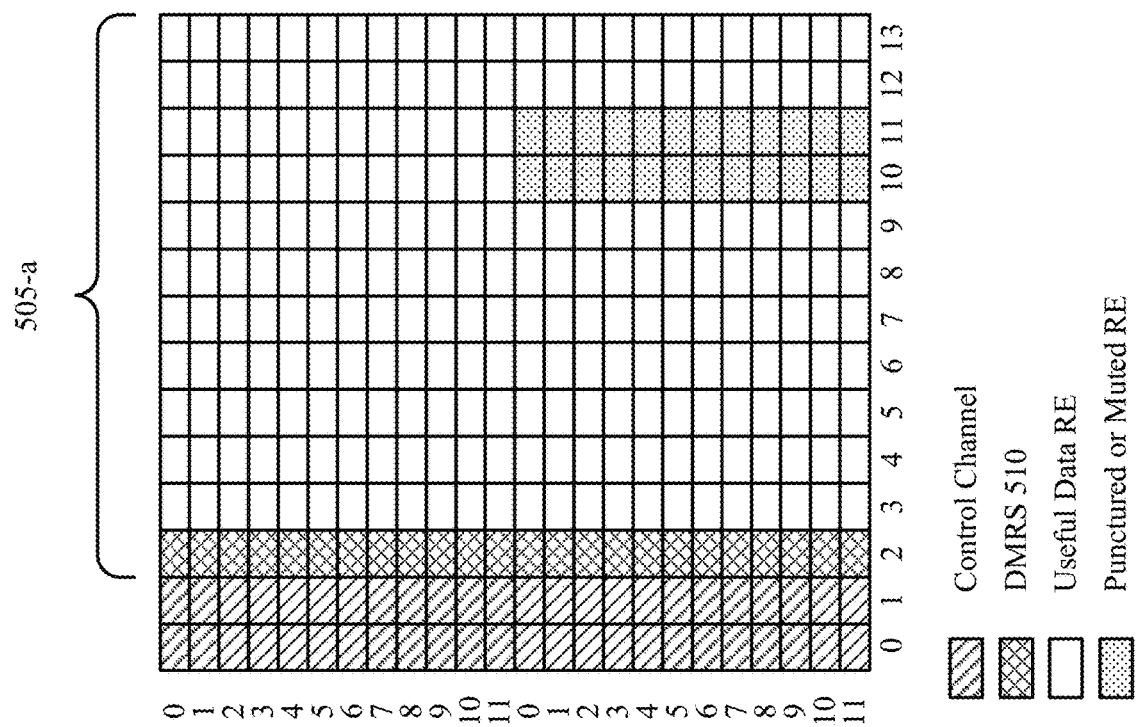

FIG. 5 illustrates an example of an RE configuration 500 that supports transmission preemption in multi-TRP operation in accordance with aspects of the present disclosure. In some examples, RE configuration 500 may implement aspects of wireless communications systems 100 and 200. RE configuration 500 may include REs that may be utilized by TRPs to transmit downlink communications (e.g., which may include TBs 505) to UEs 115. In some cases, TB 505-*a* may be transmitted by a first TRP, and TB 505-*b* may be transmitted by a second TRP. In some examples, a TB 505 may span 24 subchannels (e.g., or tones) in the frequency domain and 12 symbols in the time domain of a slot (e.g., where the slot may be 14 symbols in length). A first portion (e.g., the first two symbols) of a slot may be reserved for control signaling, and a second portion (e.g., the last 12 symbols) of the slot may be configured for a TB 505. In some cases, a portion of a TB 405 may be reserved for DMRS 510 transmission (e.g., the first symbol of a TB 505). The remaining REs of TB 505 may be utilized by a TRP to transmit TBs 505 to a UE 115. In some cases, the REs used to transmit TBs 505 (e.g., TB 505-*a* and TB 505-*b*) may utilize the same time-frequency resources. When different TRPs transmit their own TBs 505, a UE 115 may demultiplex the downlink communications transmitted by the TRPs (e.g., using spatial multiplexing, frequency domain multiplexing, or code domain multiplexing). When multiple TRPs transmit TBs 505 jointly, a UE 115 may attempt to decode the joint TBs 505 across the multiple transmissions from the TRPs.

In some cases, a TRP may puncture a TB 505 (e.g., for URLLC). For example, the 12 lowest-frequency tones of symbols 10 and 11 of TB 505-*b* may be punctured by the second TRP for URLLC transmission. The punctured REs may experience different channel conditions compared to the other data transmitted on TBs 505, which may result in a mismatched channel estimation that may prevent a UE 115 from utilizing the punctured subchannels (e.g., or tones) of TBs 505 for communication. In some examples, such as non-transparent TxD schemes (e.g., SFBC, STBC, or TRP permutation), puncturing REs may increase the complexity of signal detection at a UE 115.

As described above with reference to FIG. 2, TRPs may be configured to transmit a joint DMRS 510 on their respective TBs 505. For example, the first TRP may transmit DMRS 510 on TB 505-*a*, and the second TRP may transmit DMRS 510 on TB 505-*b*. Accordingly, a UE 115 that receives DMRS 510 from the TRPs may obtain combined channel estimates for the TRPs based on the joint DMRS 510. When one or more REs of a TB 505 are punctured, channel distortions may occur at the punctured subchannels which may interfere with TB detection and demodulation at the punctured subchannels. For example, when the second TRP punctures the 12 lowest-frequency tones of symbols 10 and 11 of TB 505-*b*, a UE 115 not be able to successfully decode and demodulate the 12 lowest-frequency tones of symbols 10 and 11 of TBs 505. In such a case, TRP 505-*a* may determine to refrain from transmitting downlink communications during the 12 lowest-frequency tones of symbols 10 and 11 of TB 505-*a*, which may reduce the interference on the punctured subchannels. While such a configuration may involve closer coordination between TRPs, DMRS overhead will not increase for TRPs that utilize a joint DMRS 510 and the negative effects that puncturing has on channel estimation and detection may be mitigated.

As described above with reference to FIG. 2, one or more TRPs may transmit one or more PIs to a UE 115 to indicate whether TBs 505 are punctured (e.g., or not utilized for transmission). For example, when the second TRP punctures the 12 lowest-frequency tones of symbols 10 and 11 of TB 505-*b*, the second TRP may transmit a PI that indicates that the 12 lowest-frequency tones of symbols 10 and 11 of TB 505-*b* are punctured. In such a case, the first TRP may determine to refrain from utilizing the 12 lowest-frequency tones of symbols 10 and 11 of TB 505-*a* for communications to avoid interference on these subchannels, which may cause the first TRP to transmit a PI that indicates that the 12 lowest-frequency tones of symbols 10 and 11 of TB 505-*a* are not utilized for communications. In some cases, one or more TRPs may transmit one or more joint PIs which may indicate which REs of TBs 505 are punctured (e.g., or not utilized) with (e.g., or without) an indication the puncturing TRP. For example, one or more TRPs may transmit one or more joint PIs which may indicate that the 12 lowest-frequency tones of symbols 10 and 11 of TBs 505 are punctured (e.g., or not utilized), and the joint PIs may or may not indicate that the punctured REs are associated with TB 505-*a* or TB 505-*b*.

Such PIs may allow a UE 115 to determine to refrain from detecting the subchannels that are punctured or not utilized. For example, when the first TRP and the second TRP transmit PIs to a UE 115 that indicate that the 12 lowest-frequency tones of symbols 10 and 11 of TBs 505 are punctured or not utilized (e.g., or when a joint PI that indicates the same information is transmitted), the UE 115 may determine to not attempt channel detection and demodulation on the 12 lowest-frequency tones of symbols 10 and 11 of TBs 505.

Figure 6:
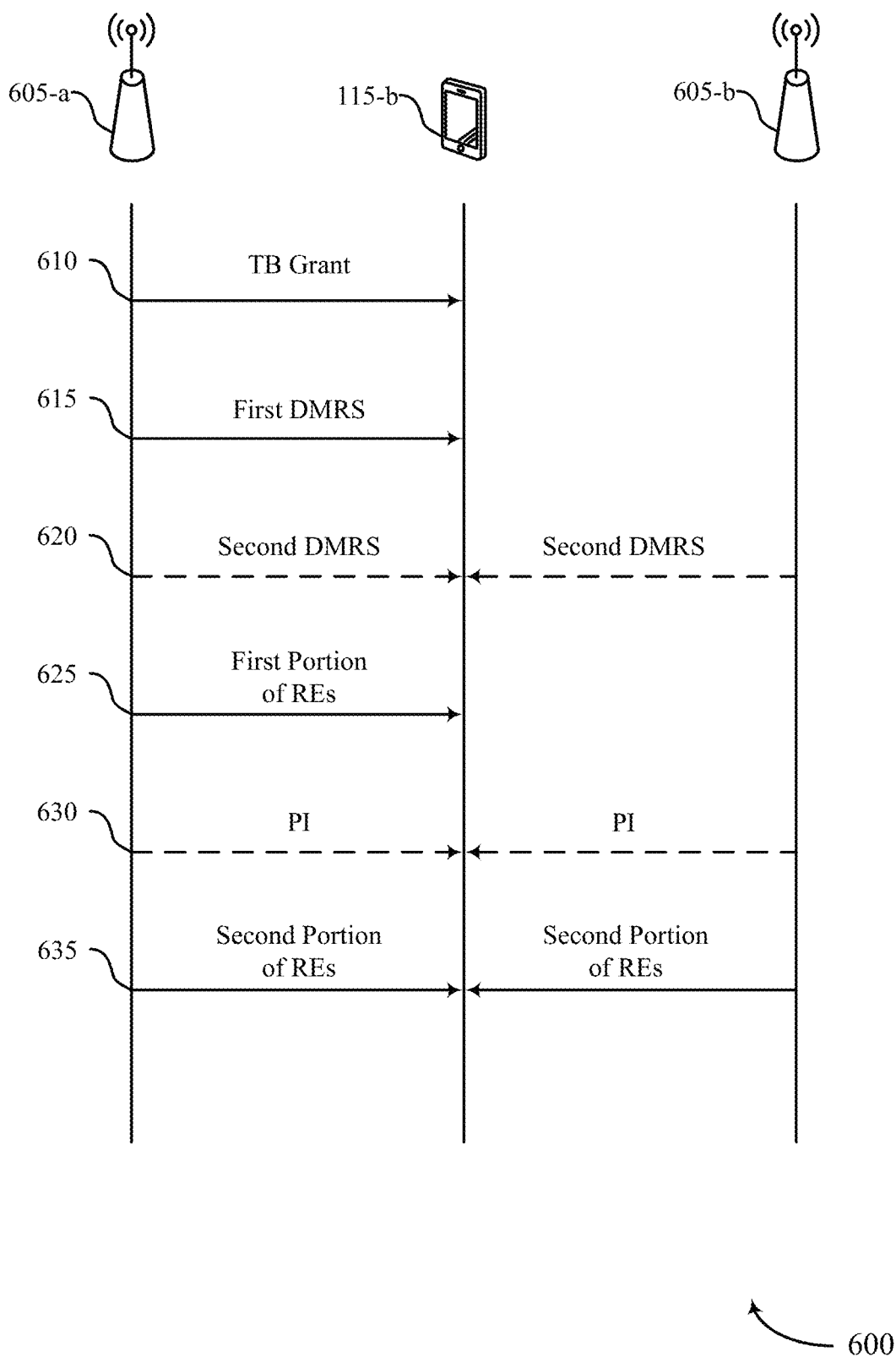
FIG. 6 illustrates an example of a process flow that supports transmission preemption in multi-TRP operation in accordance with aspects of the present disclosure.

FIG. 6 illustrates an example of a process flow 600 that supports transmission preemption in multi-TRP operation in accordance with aspects of the present disclosure. In some examples, process flow 600 may implement aspects of wireless communications systems 100 and 200. Process flow 600 may include TRP 605-*a*, TRP 605-*b*, and UE 115-*b*, each of which may examples of the components as described above.

At 610, TRP 605-*a* may transmit, and UE 115-*b* may receive, a grant for a TB including a plurality of REs.

At 615, TRP 605-*a* may transmit, and UE 115-*b* may receive, a first DMRS. The first DMRS may be specific to TRP 605-*a*. In some cases, TRP 605-*a* may transmit, and UE 115-*b* may receive, a first OFDM symbol of the first portion of the REs where the first symbol includes the first DMRS. In some cases, TRP 605-*a* may transmit, and UE 115-*b* may receive, one or more symbols subsequent to the first symbol of the first portion of the REs where the one or more symbols subsequent to the first symbol of the first portion of the REs comprise data of the TB.

In some cases, the first DMRS may be specific to a combination of TRP 605-*a* and TRP 605-*b*. The first DMRS may be transmitted by one or more of TRP 605-*a*, TRP 605-*b*, or a combination thereof. UE 115-*b* may identify a first portion of the REs associated with puncturing by TRP 605-*a* or TRP 605-*b*. In some cases, this identification may be based on the first DMRS.

At 620, UE 115-*b* may receive a second DMRS. The second DMRS may be specific to one or more of TRP 605-*b* or a combination of TRP 605-*a* and TRP 605-*b*. In some cases, the first DMRS and the second DMRS may be received during a same OFDM symbol such that UE 115-*b* may demultiplex the first DMRS and the second DMRS from the OFDM symbol. The demultiplexing may be based on a multiplexing scheme using one or more of spatial multiplexing, frequency domain multiplexing, or code domain multiplexing. When the second DMRS is specific to TRP 605-*b*, UE 115-*b* may obtain a combined channel estimate for the TRP 605-*a* and TRP 605-*b* using the first DMRS and the second DMRS. It should be noted that UE 115-*b* may receive one or more DMRSs from TRP 605-*a* and TRP 605-*b*, where the one or more DMRSs may be transmitted (e.g., and/or received) at the same point in time or at different points in time.

At 625, UE 115-*b* may receive, based at least in part on the first DMRS, a transmission from the TRP 605-*a* of a first portion of the REs. In some cases, TRP 605-*a* may transmit one or more symbols subsequent to the first symbol of the first portion of the REs, the one or more symbols subsequent to the first symbol of the first portion of the REs including data of the TB.

At 630, UE 115-*b* may receive a first PI message indicating that the first portion of the REs is punctured by TRP 605-*b*. In some cases, UE 115-*b* may receive a second PI message indicating that a third portion of the REs of the TB is punctured by the TRP 605-*a*. UE 115-*b* may receive the third portion of the REs of the TB using one or more of the second DMRS or a third DMRS specific to TRP 605-*b*. The first PI message and the second PI message may be received from one or more of TRP 605-*a*, TRP 605-*b*, or a combination thereof. In some cases, the first PI message may further indicate that the third portion of the REs of the TB is punctured by TRP 605-*a*. In some cases, UE 115-*b* may identify the first portion of REs based on receiving the first PI. It should be noted that the first PI and the second PI may be transmitted at different points in time.

At 635, UE 115-*b* may receive, based at least in part on the second DMRS, a joint transmission of a second portion of the REs from TRP 605-*a* and TRP 605-*b*. When the second DMRS is specific to TRP 605-*b*, UE 115-*b* may receive the joint transmission of the second portion of the REs based on the combined channel estimate.

Figure 7:
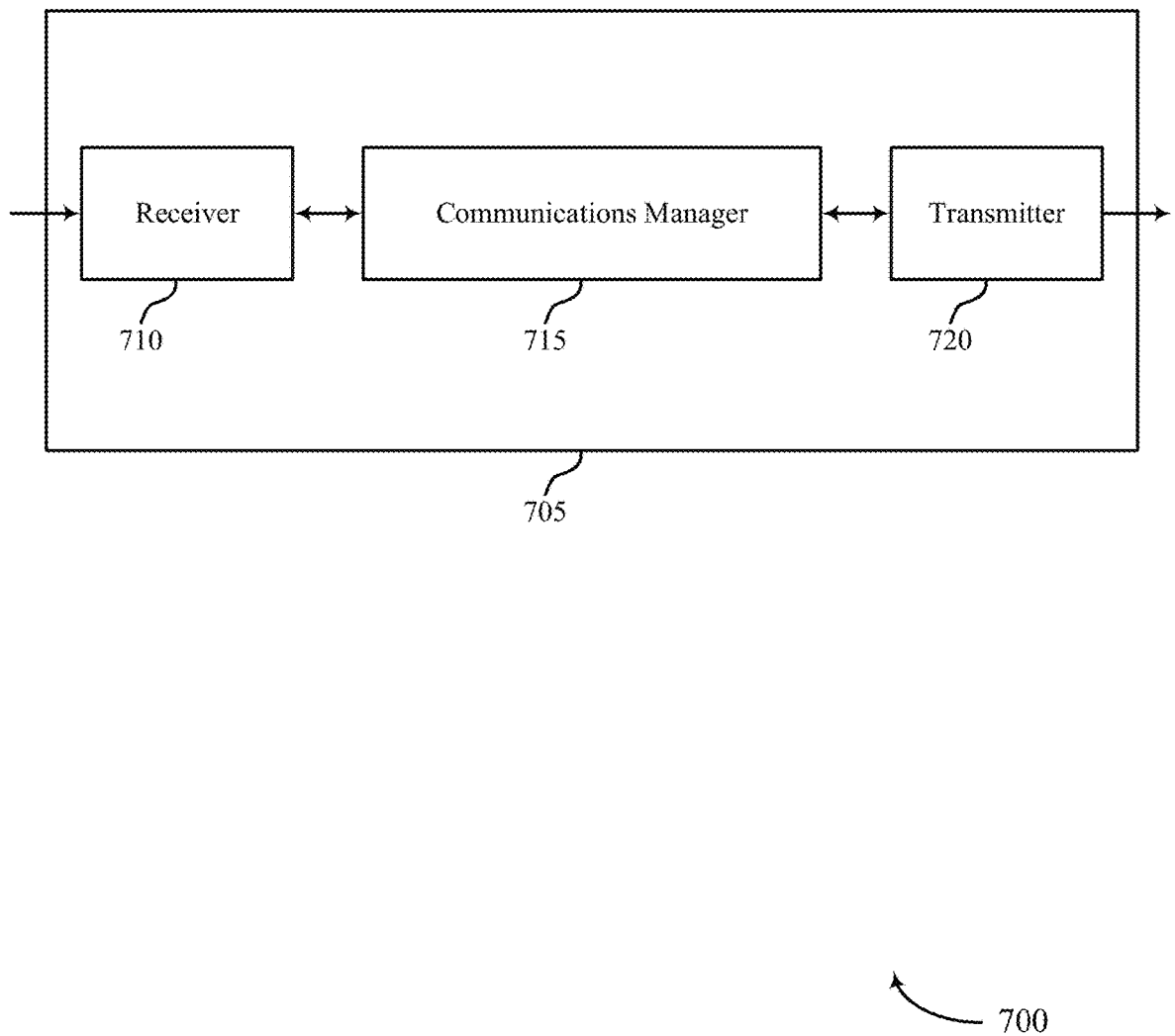
FIGS. 7 and 8 show block diagrams of devices that support transmission preemption in multi-TRP operation in accordance with aspects of the present disclosure.

In some cases, the first portion of the REs and the second portion of the REs may be non-overlapping. In such a case, UE 115-*b* may determine to ignore the first portion of the REs FIG. 7 shows a block diagram 700 of a device 705 that supports transmission preemption in multi-TRP operation in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to transmission preemption in multi-TRP operation). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive a grant for a TB including a set of REs, receive a first DMRS and a second DMRS, where the first DMRS is specific to a first TRP, and the second DMRS is specific to one or more of: a second TRP or a combination of the first TRP and the second TRP, receive, based on the first DMRS, a transmission from the first TRP of a first portion of the REs, and receive, based on the second DMRS, a joint transmission of a second portion of the REs from the first TRP and the second TRP. The communications manager 715 may also receive a grant for a TB including a set of REs, identify a first portion of the REs associated with puncturing by the first TRP or the second TRP, receive a DMRS specific to a combination of a first TRP and a second TRP, and receive, based on the DMRS, a joint transmission of a second portion of the REs from the first TRP and the second TRP, where the first portion of the REs and the second portion of the REs are non-overlapping. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
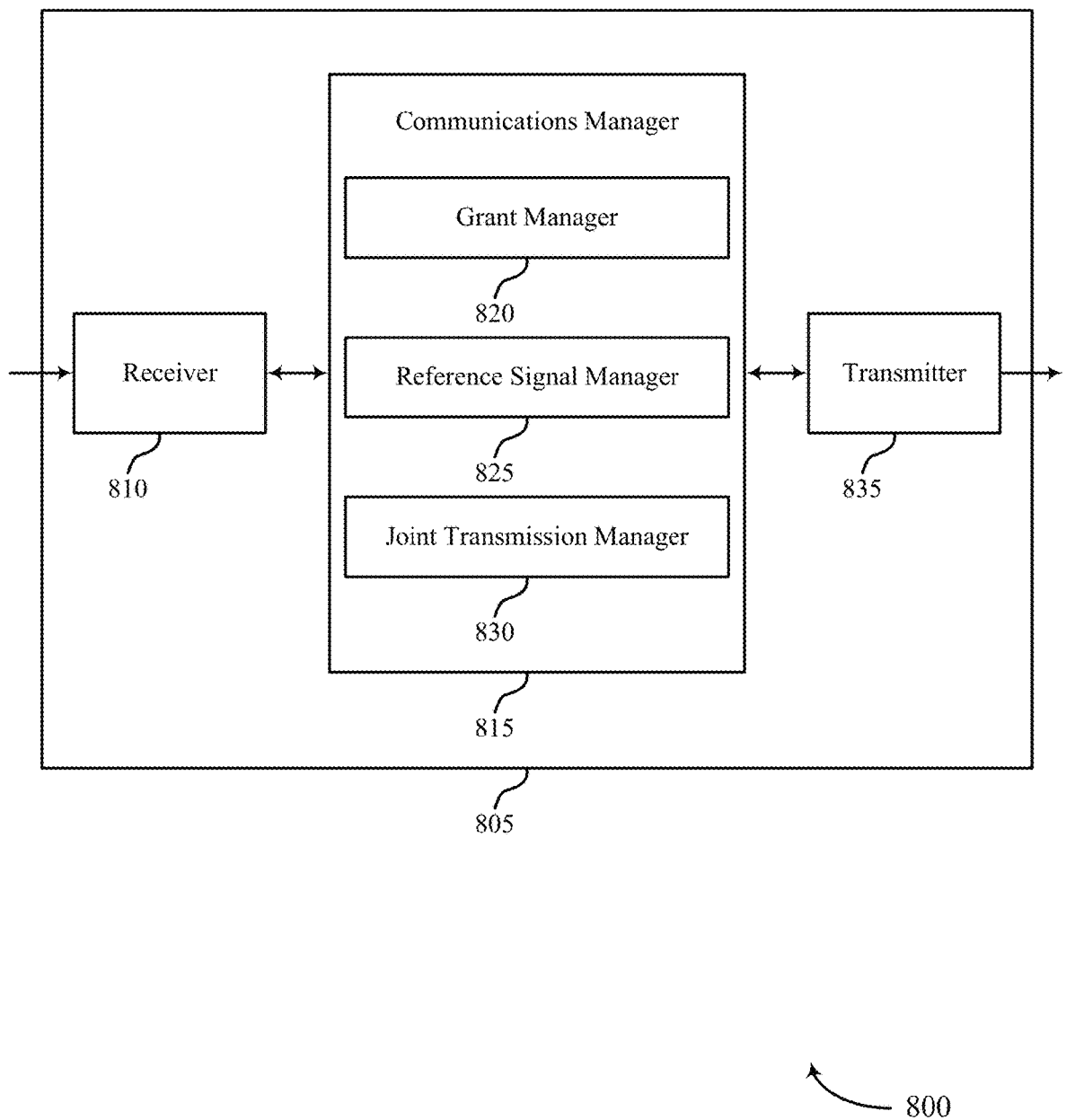

FIG. 8 shows a block diagram 800 of a device 805 that supports transmission preemption in multi-TRP operation in accordance with aspects of the present disclosure. The device 805 may be an example of aspects of a device 705 or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to transmission preemption in multi-TRP operation). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a grant manager 820, a reference signal manager 825, and a joint transmission manager 830. The communications manager 815 may be an example of aspects of the communications manager 1010 described herein.

The grant manager 820 may receive a grant for a TB including a set of REs. The grant manager 820 may receive a grant for a TB including a set of REs and identify a first portion of the REs associated with puncturing by the first TRP or the second TRP.

The reference signal manager 825 may receive a first DMRS and a second DMRS, where the first DMRS is specific to a first TRP, and the second DMRS is specific to one or more of: a second TRP or a combination of the first TRP and the second TRP. The reference signal manager 825 may receive a DMRS specific to a combination of a first TRP and a second TRP.

The joint transmission manager 830 may receive, based on the first DMRS, a transmission from the first TRP of a first portion of the REs and receive, based on the second DMRS, a joint transmission of a second portion of the REs from the first TRP and the second TRP. The joint transmission manager 830 may receive, based on the DMRS, a joint transmission of a second portion of the REs from the first TRP and the second TRP, where the first portion of the REs and the second portion of the REs are non-overlapping.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
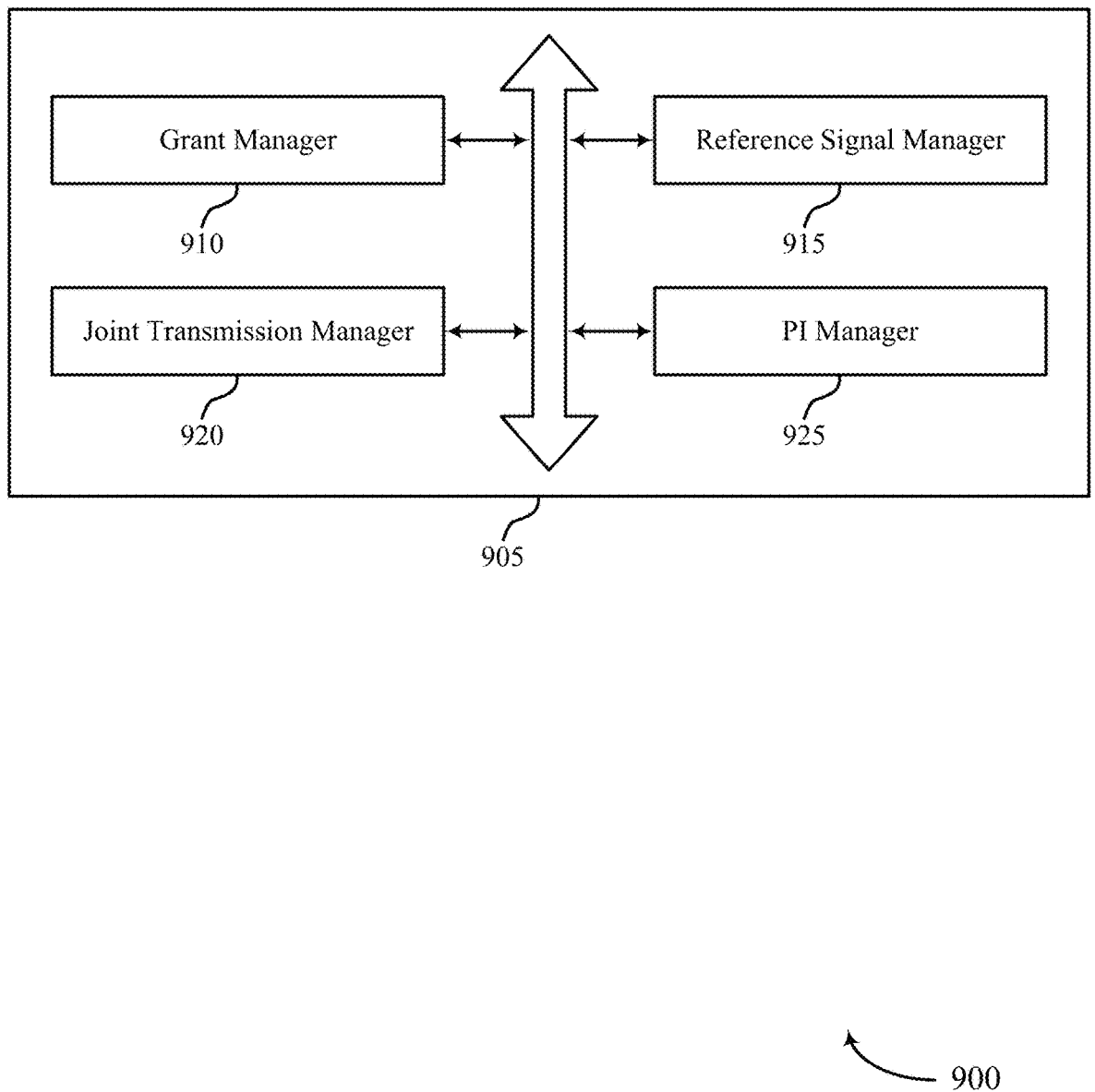
FIG. 9 shows a block diagram of a communications manager that supports transmission preemption in multi-TRP operation in accordance with aspects of the present disclosure.

FIG. 9 shows a block diagram 900 of a communications manager 905 that supports transmission preemption in multi-TRP operation in accordance with aspects of the present disclosure. The communications manager 905 may be an example of aspects of a communications manager 715, a communications manager 815, or a communications manager 1010 described herein. The communications manager 905 may include a grant manager 910, a reference signal manager 915, a joint transmission manager 920, and a PI manager 925. Each of these modules may communicate, directly or indirectly, with one another (e.g., via one or more buses).

The grant manager 910 may receive a grant for a TB including a set of REs. In some examples, the grant manager 910 may receive a grant for a TB including a set of REs. In some cases, the grant manager 910 may identify a first portion of the REs associated with puncturing by the first TRP or the second TRP.

The reference signal manager 915 may receive a first DMRS and a second DMRS, where the first DMRS is specific to a first TRP, and the second DMRS is specific to one or more of: a second TRP or a combination of the first TRP and the second TRP. In some examples, the reference signal manager 915 may receive a DMRS specific to a combination of a first TRP and a second TRP. In some cases, the reference signal manager 915 may demultiplex the first DMRS and the second DMRS from the OFDM symbol. In some instances, the reference signal manager 915 may multiplex a first DMRS and a second DMRS according to a multiplexing (e.g., spatial multiplexing, frequency domain multiplexing, or code domain multiplexing) scheme. In some aspects, the reference signal manager 915 may obtain a combined channel estimate for the first TRP and the second TRP using the first DMRS and the second DMRS. In some examples, the reference signal manager 915 may receive from the first TRP a first OFDM symbol of the first portion of the REs, the first symbol including the first DMRS. In some cases, the reference signal manager 915 may receive from the first TRP one or more symbols subsequent to the first symbol of the first portion of the REs, the one or more symbols subsequent to the first symbol of the first portion of the REs including data of the TB.

The joint transmission manager 920 may receive, based on the first DMRS, a transmission from the first TRP of a first portion of the REs. In some examples, the joint transmission manager 920 may receive, based on the second DMRS, a joint transmission of a second portion of the REs from the first TRP and the second TRP. In some cases, the joint transmission manager 920 may receive, based on the DMRS, a joint transmission of a second portion of the REs from the first TRP and the second TRP, where the first portion of the REs and the second portion of the REs are non-overlapping. In some instances, the joint transmission manager 920 may where receiving the joint transmission of the second portion of the REs is based on the combined channel estimate. In some aspects, the joint transmission manager 920 may ignore the first portion of the REs.

The PI manager 925 may receive a first PI message indicating that the first portion of the REs is punctured by the second TRP. In some examples, the PI manager 925 may receive a second PI message indicating that a third portion of the REs of the TB is punctured by the first TRP. In some cases, the PI manager 925 may receive the third portion of the REs of the TB using one or more of: the second DMRS or a third DMRS specific to the second TRP. In some instances, the PI manager 925 may receive a PI message indicating the first portion of the REs. In some cases, the PI manager 925 may receive a PI message over one or more of the first TRP, the second TRP, or a combination thereof. In some cases, the first PI message further indicates that a third portion of the REs of the TB is punctured by the first TRP.

Figure 10:
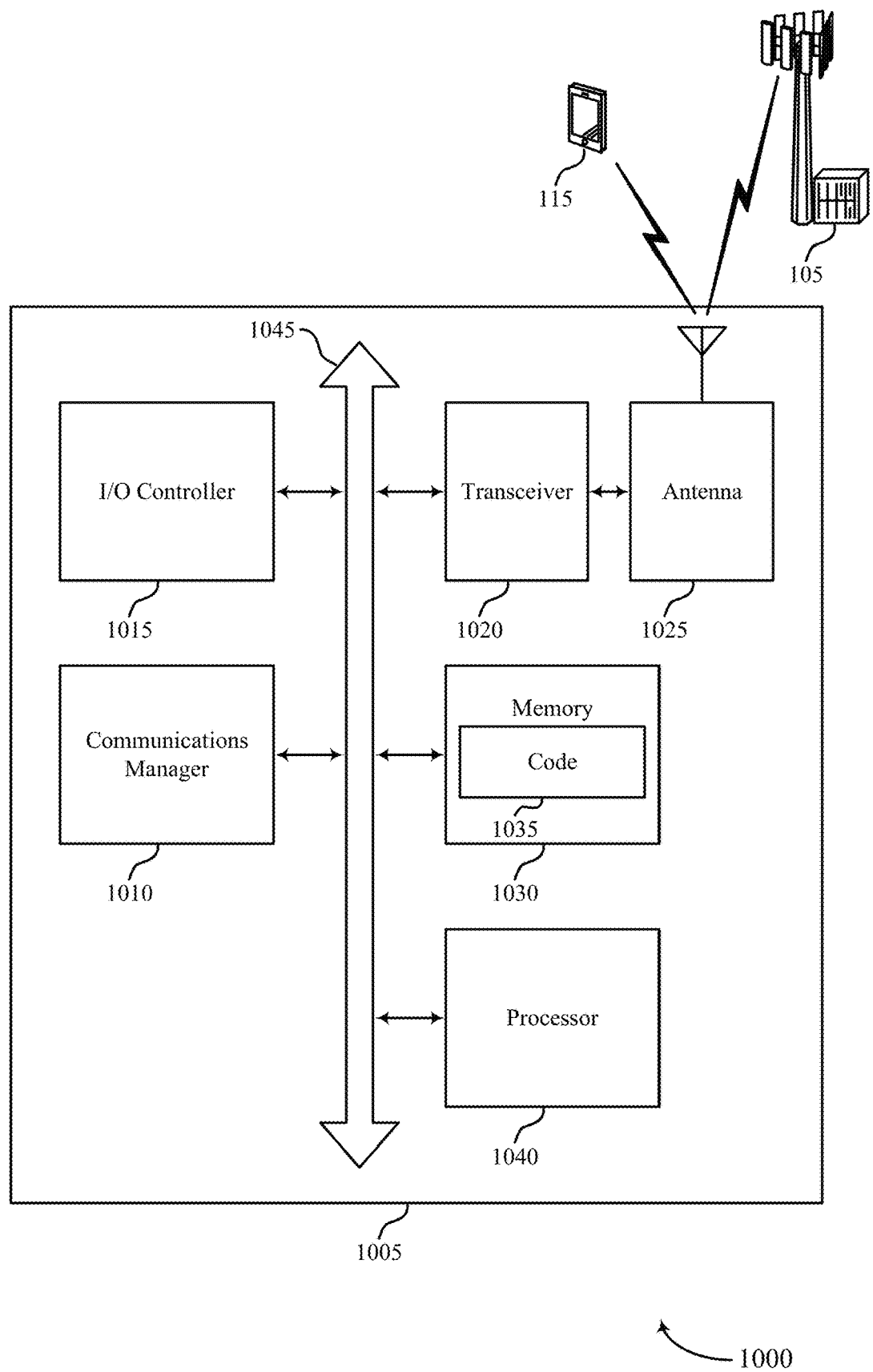
FIG. 10 shows a diagram of a system including a device that supports transmission preemption in multi-TRP operation in accordance with aspects of the present disclosure.

FIG. 10 shows a diagram of a system 1000 including a device 1005 that supports transmission preemption in multi-TRP operation in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive a grant for a TB including a set of REs, receive a first DMRS and a second DMRS, where the first DMRS is specific to a first TRP, and the second DMRS is specific to one or more of: a second TRP or a combination of the first TRP and the second TRP, receive, based on the first DMRS, a transmission from the first TRP of a first portion of the REs, and receive, based on the second DMRS, a joint transmission of a second portion of the REs from the first TRP and the second TRP. The communications manager 1010 may also receive a grant for a TB including a set of REs, identify a first portion of the REs associated with puncturing by the first TRP or the second TRP, receive a DMRS specific to a combination of a first TRP and a second TRP, and receive, based on the DMRS, a joint transmission of a second portion of the REs from the first TRP and the second TRP, where the first portion of the REs and the second portion of the REs are non-overlapping.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic input/output system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a PLD, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting transmission preemption in multi-TRP operation).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
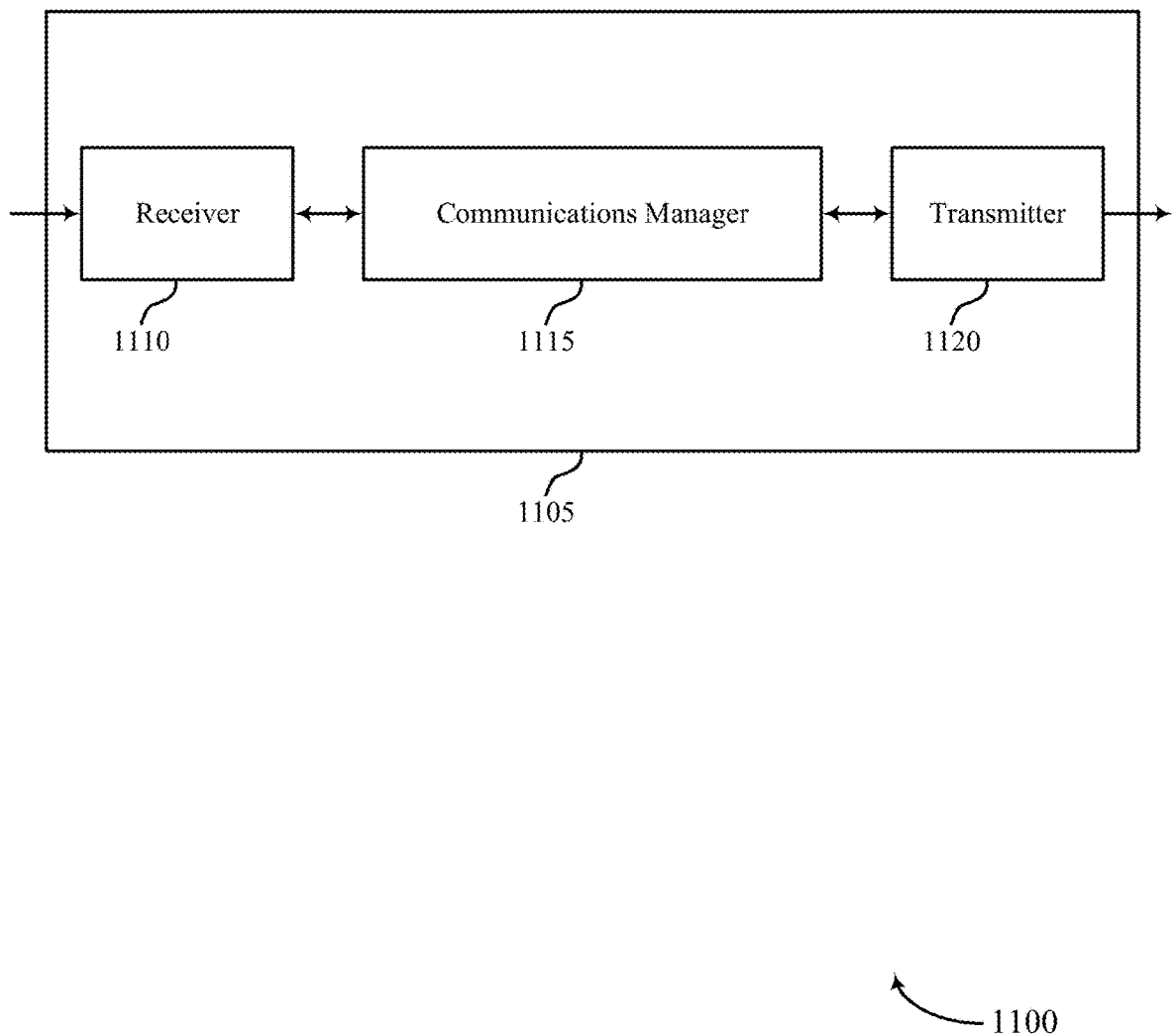
FIGS. 11 and 12 show block diagrams of devices that support transmission preemption in multi-TRP operation in accordance with aspects of the present disclosure.

FIG. 11 shows a block diagram 1100 of a device 1105 that supports transmission preemption in multi-TRP operation in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to transmission preemption in multi-TRP operation). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may transmit a grant for a TB including a set of REs, transmit a first DMRS from a first TRP according to a multiplexing scheme between the first DMRS and a second DMRS from a second TRP, where the first DMRS is specific to the first TRP and the second DMRS is specific to one or more of: a second TRP or a combination of the first TRP and the second TRP, transmit, by the first TRP based on the first DMRS, a first portion of the REs, and perform, by the first TRP based on the second DMRS, a joint transmission with the second TRP of a second portion of the REs. The communications manager 1115 may also transmit to a UE a grant for a TB including a set of REs, identify a first portion of the REs associated with puncturing by the second TRP, transmit a DMRS specific to a combination of a first TRP and a second TRP, refrain from transmitting from the first TRP to the UE during the first portion of the REs, and perform, by the first TRP, a joint transmission with the second TRP of a second portion of the REs, where the first portion of the REs and the second portion of the REs are non-overlapping. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an ASIC, a FPGA or other PLD, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
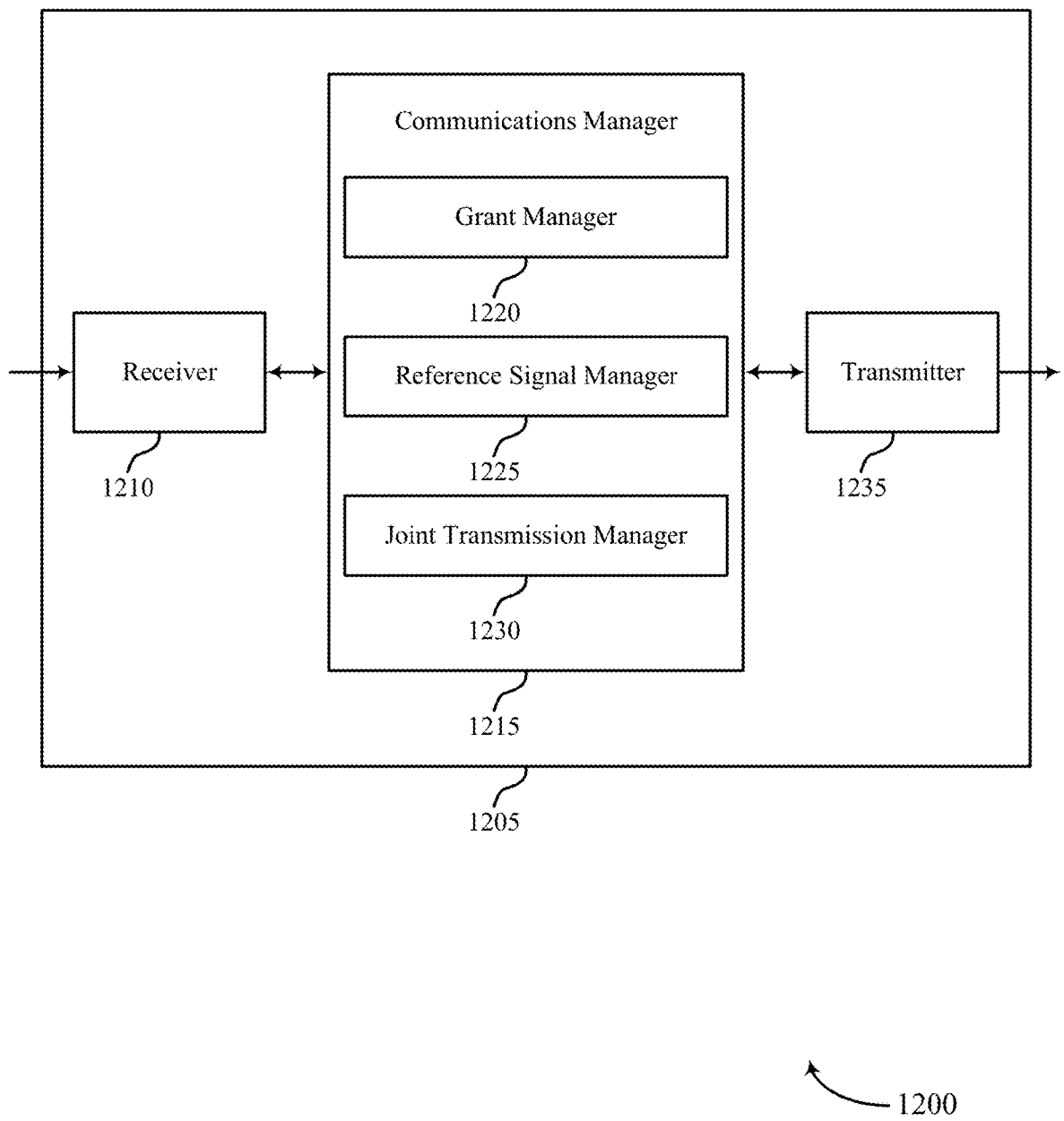

FIG. 12 shows a block diagram 1200 of a device 1205 that supports transmission preemption in multi-TRP operation in accordance with aspects of the present disclosure. The device 1205 may be an example of aspects of a device 1105 or a base station 105 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to transmission preemption in multi-TRP operation). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a grant manager 1220, a reference signal manager 1225, and a joint transmission manager 1230. The communications manager 1215 may be an example of aspects of the communications manager 1410 described herein.

The grant manager 1220 may transmit a grant for a TB including a set of REs. The grant manager 1220 may transmit to a UE a grant for a TB including a set of REs and identify a first portion of the REs associated with puncturing by the second TRP. The reference signal manager 1225 may transmit a DMRS specific to a combination of a first TRP and a second TRP.

The reference signal manager 1225 may transmit a first DMRS from a first TRP according to a multiplexing scheme between the first DMRS and a second DMRS from a second TRP, where the first DMRS is specific to the first TRP and the second DMRS is specific to one or more of: a second TRP or a combination of the first TRP and the second TRP.

The joint transmission manager 1230 may transmit, by the first TRP based on the first DMRS, a first portion of the REs and perform, by the first TRP based on the second DMRS, a joint transmission with the second TRP of a second portion of the REs. The joint transmission manager 1230 may refrain from transmitting from the first TRP to the UE during the first portion of the REs and perform, by the first TRP, a joint transmission with the second TRP of a second portion of the REs, where the first portion of the REs and the second portion of the REs are non-overlapping.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
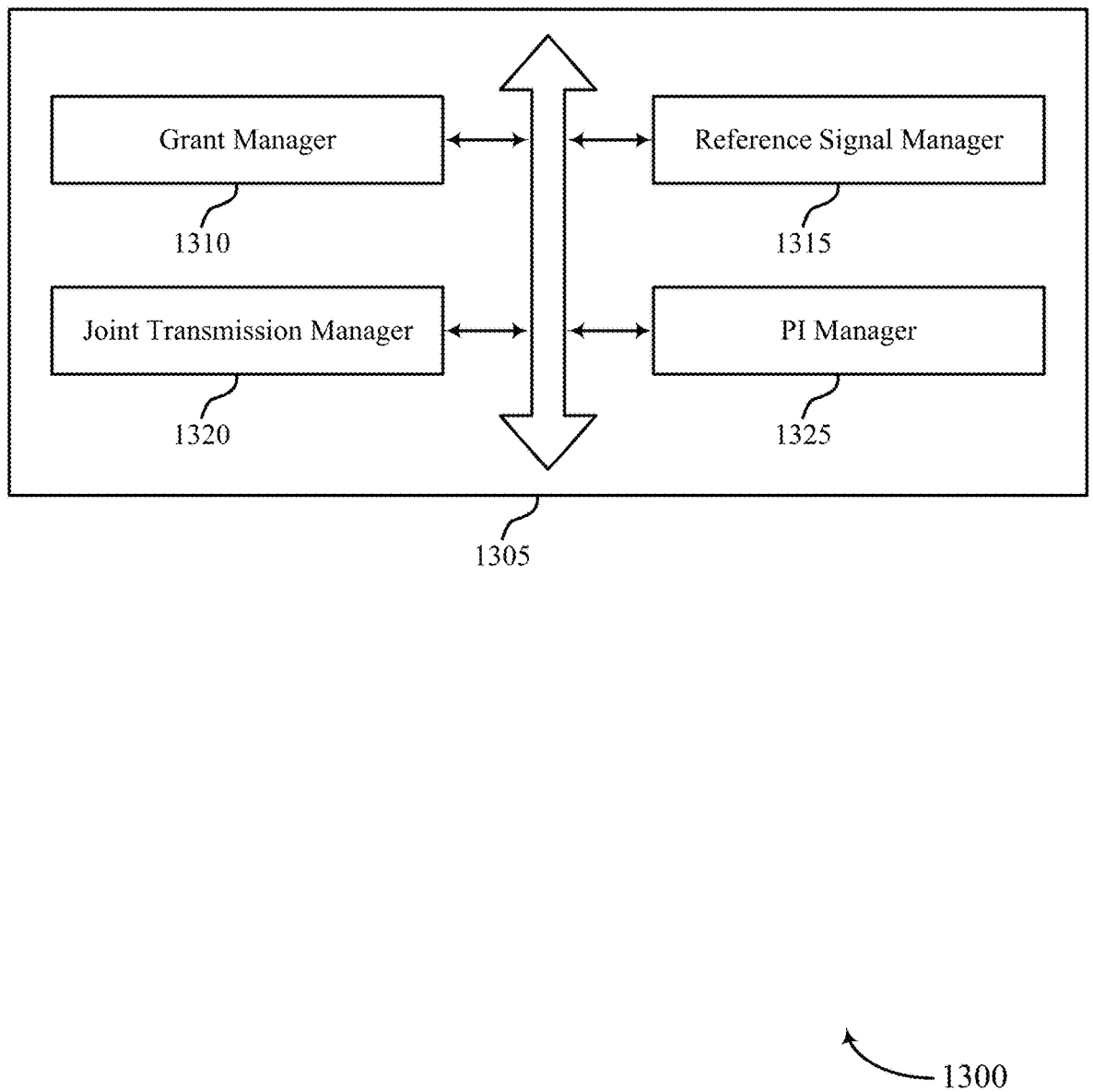
FIG. 13 shows a block diagram of a communications manager that supports transmission preemption in multi-TRP operation in accordance with aspects of the present disclosure.

FIG. 13 shows a block diagram 1300 of a communications manager 1305 that supports transmission preemption in multi-TRP operation in accordance with aspects of the present disclosure. The communications manager 1305 may be an example of aspects of a communications manager 1115, a communications manager 1215, or a communications manager 1410 described herein. The communications manager 1305 may include a grant manager 1310, a reference signal manager 1315, a joint transmission manager 1320, and a PI manager 1325. Each of these modules may communicate, directly or indirectly, with one another (e.g., via one or more buses).

The grant manager 1310 may transmit a grant for a TB including a set of REs. In some examples, the grant manager 1310 may transmit to a UE a grant for a TB including a set of REs. In some cases, the grant manager 1310 may identify a first portion of the REs associated with puncturing by the second TRP.

The reference signal manager 1315 may transmit a first DMRS from a first TRP according to a multiplexing scheme between the first DMRS and a second DMRS from a second TRP, where the first DMRS is specific to the first TRP and the second DMRS is specific to one or more of: a second TRP or a combination of the first TRP and the second TRP. In some examples, the reference signal manager 1315 may transmit a DMRS specific to a combination of a first TRP and a second TRP. In some cases, the reference signal manager 1315 may transmit a first symbol of the first portion of the REs, the first symbol including the first DMRS.

The joint transmission manager 1320 may transmit, by the first TRP based on the first DMRS, a first portion of the REs. In some examples, the joint transmission manager 1320 may perform, by the first TRP based on the second DMRS, a joint transmission with the second TRP of a second portion of the REs. In some cases, the joint transmission manager 1320 may refrain from transmitting from the first TRP to the UE during the first portion of the REs. In some instances, the joint transmission manager 1320 may perform, by the first TRP, a joint transmission with the second TRP of a second portion of the REs, where the first portion of the REs and the second portion of the REs are non-overlapping. In some aspects, the joint transmission manager 1320 may transmit one or more symbols subsequent to the first symbol of the first portion of the REs, the one or more symbols subsequent to the first symbol of the first portion of the REs including data of the TB.

The PI manager 1325 may transmit a first PI message indicating that the first portion of the REs is punctured by the second TRP. In some examples, the PI manager 1325 may transmit a second PI message indicating that a third portion of the REs of the TB is punctured by the first TRP. In some cases, the PI manager 1325 may transmit a PI message indicating the first portion of the REs. In some cases, the first PI message further indicates that a third portion of the REs of the TB is punctured by the first TRP.

Figure 14:
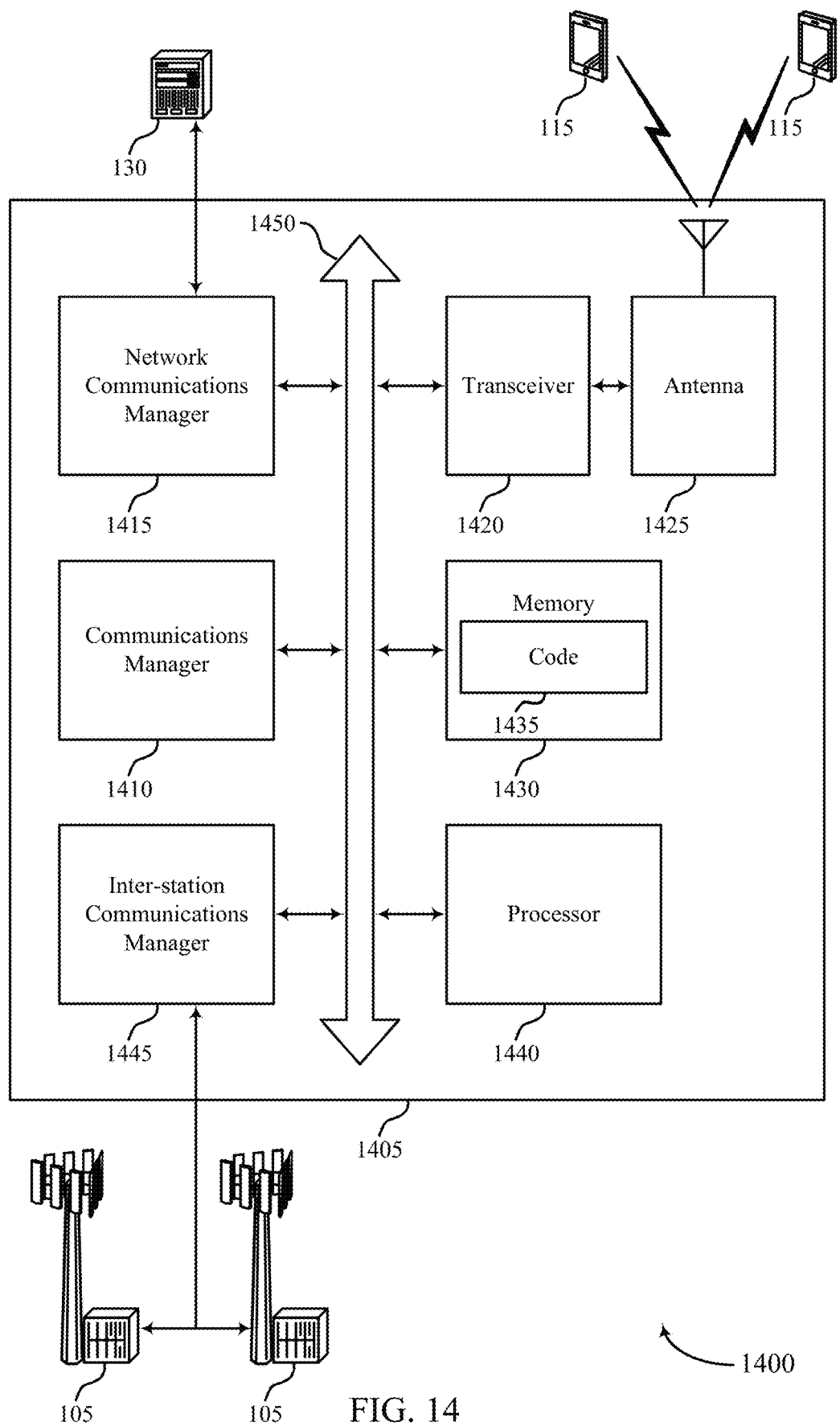
FIG. 14 shows a diagram of a system including a device that supports transmission preemption in multi-TRP operation in accordance with aspects of the present disclosure.

FIG. 14 shows a diagram of a system 1400 including a device 1405 that supports transmission preemption in multi-TRP operation in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may transmit a grant for a TB including a set of REs, transmit a first DMRS from a first TRP according to a multiplexing scheme between the first DMRS and a second DMRS from a second TRP, where the first DMRS is specific to the first TRP and the second DMRS is specific to one or more of: a second TRP or a combination of the first TRP and the second TRP, transmit, by the first TRP based on the first DMRS, a first portion of the REs, and perform, by the first TRP based on the second DMRS, a joint transmission with the second TRP of a second portion of the REs. The communications manager 1410 may also transmit to a UE a grant for a TB including a set of REs, identify a first portion of the REs associated with puncturing by the second TRP, transmit a DMRS specific to a combination of a first TRP and a second TRP, refrain from transmitting from the first TRP to the UE during the first portion of the REs, and perform, by the first TRP, a joint transmission with the second TRP of a second portion of the REs, where the first portion of the REs and the second portion of the REs are non-overlapping.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a PLD, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device #{device} to perform various functions (e.g., functions or tasks supporting transmission preemption in multi-TRP operation).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
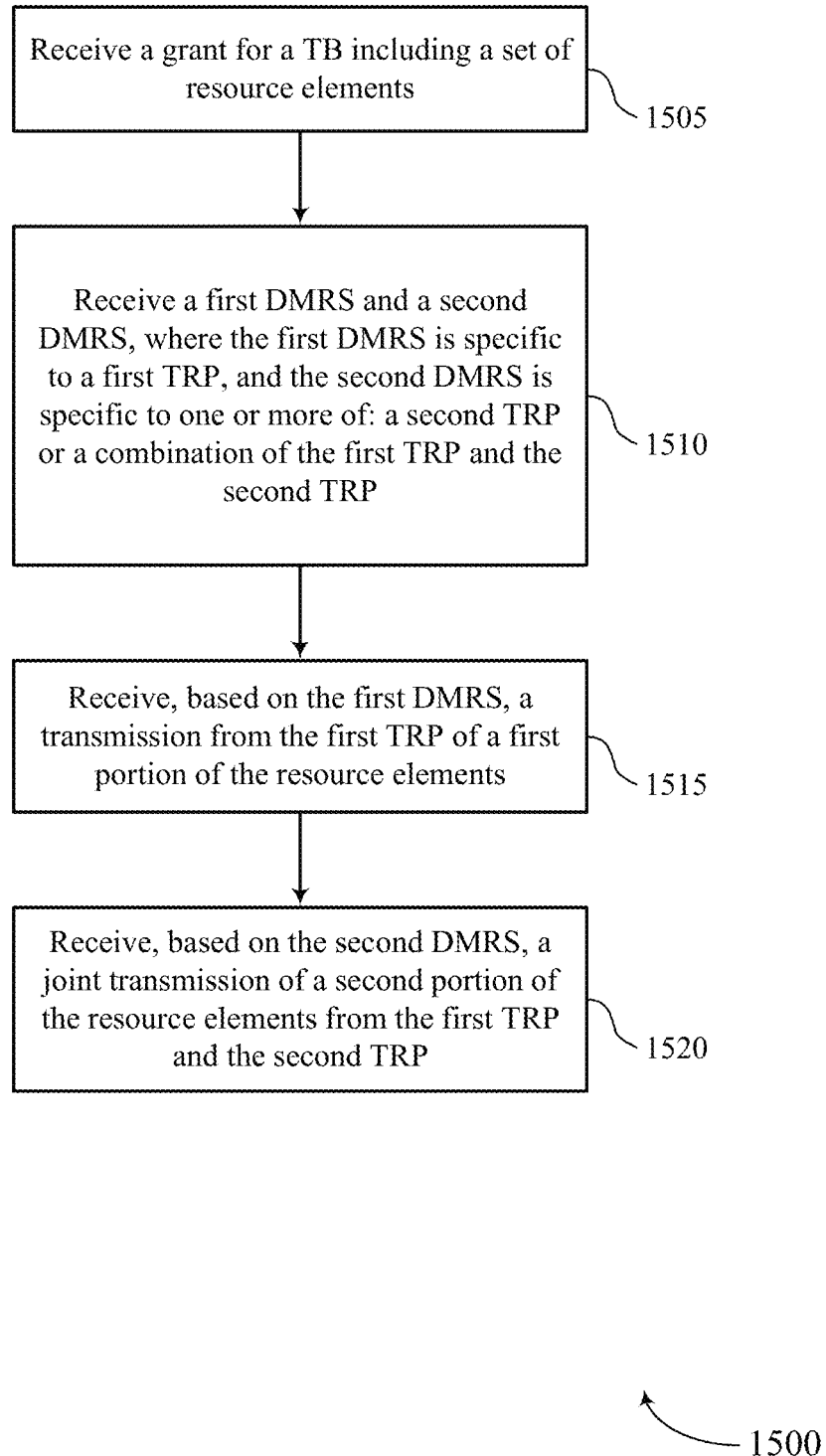
FIGS. 15 through 18 show flowcharts illustrating methods that support transmission preemption in multi-TRP operation in accordance with aspects of the present disclosure.

FIG. 15 shows a flowchart illustrating a method 1500 that supports transmission preemption in multi-TRP operation in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may receive a grant for a TB including a set of resource elements. The operations of 1505 may be performed according to the methods described herein. In some examples, aspects of the operations of 1505 may be performed by a grant manager as described with reference to FIGS. 7 through 10.

At 1510, the UE may receive a first DMRS and a second DMRS, where the first DMRS is specific to a first TRP, and the second DMRS is specific to one or more of: a second TRP or a combination of the first TRP and the second TRP. The operations of 1510 may be performed according to the methods described herein. In some examples, aspects of the operations of 1510 may be performed by a reference signal manager as described with reference to FIGS. 7 through 10.

At 1515, the UE may receive, based on the first DMRS, a transmission from the first TRP of a first portion of the resource elements. The operations of 1515 may be performed according to the methods described herein. In some examples, aspects of the operations of 1515 may be performed by a joint transmission manager as described with reference to FIGS. 7 through 10.

At 1520, the UE may receive, based on the second DMRS, a joint transmission of a second portion of the resource elements from the first TRP and the second TRP. The operations of 1520 may be performed according to the methods described herein. In some examples, aspects of the operations of 1520 may be performed by a joint transmission manager as described with reference to FIGS. 7 through 10.

Figure 16:
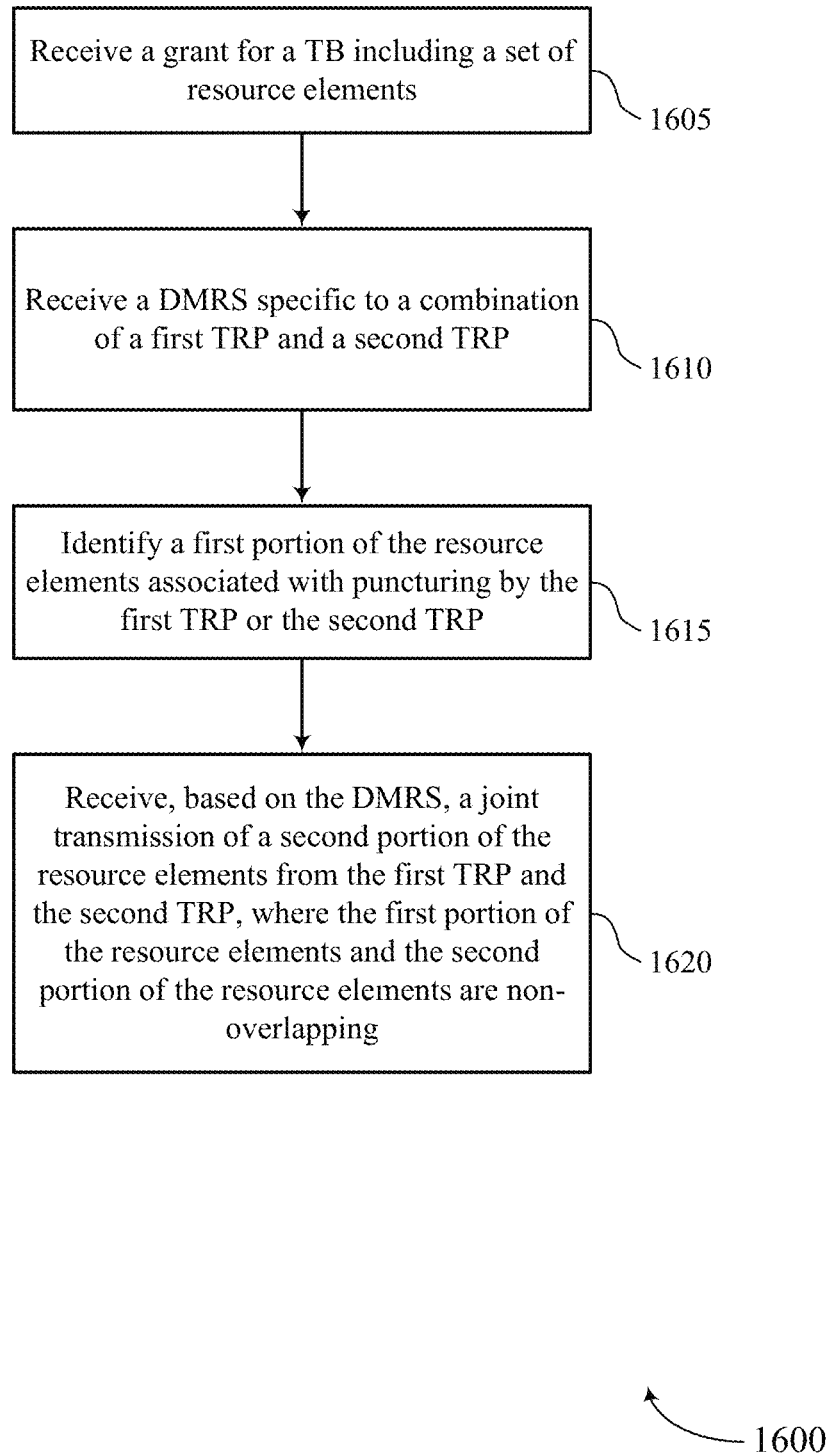

FIG. 16 shows a flowchart illustrating a method 1600 that supports transmission preemption in multi-TRP operation in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may receive a grant for a TB including a set of resource elements. The operations of 1605 may be performed according to the methods described herein. In some examples, aspects of the operations of 1605 may be performed by a grant manager as described with reference to FIGS. 7 through 10.

At 1610, the UE may receive a DMRS specific to a combination of a first TRP and a second TRP. The operations of 1610 may be performed according to the methods described herein. In some examples, aspects of the operations of 1610 may be performed by a reference signal manager as described with reference to FIGS. 7 through 10.

At 1615, the UE may identify a first portion of the resource elements associated with puncturing by the first TRP or the second TRP. The operations of 1615 may be performed according to the methods described herein. In some examples, aspects of the operations of 1615 may be performed by a grant manager as described with reference to FIGS. 7 through 10.

At 1620, the UE may receive, based on the DMRS, a joint transmission of a second portion of the resource elements from the first TRP and the second TRP, where the first portion of the resource elements and the second portion of the resource elements are non-overlapping. The operations of 1620 may be performed according to the methods described herein. In some examples, aspects of the operations of 1620 may be performed by a joint transmission manager as described with reference to FIGS. 7 through 10.

Figure 17:
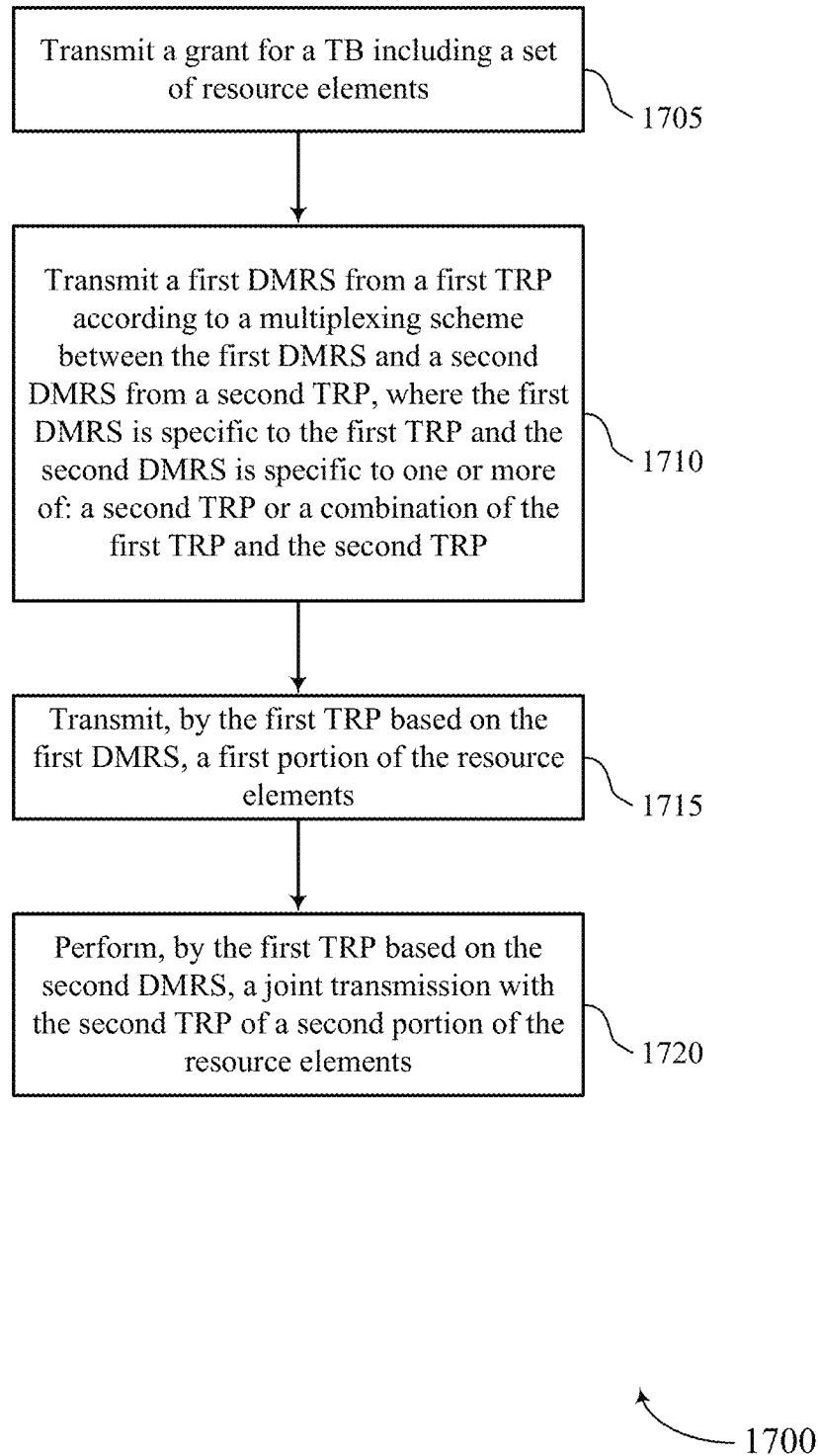

FIG. 17 shows a flowchart illustrating a method 1700 that supports transmission preemption in multi-TRP operation in accordance with aspects of the present disclosure. The operations of method 1700 may be implemented by a base station 105 or its components as described herein. For example, the operations of method 1700 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1705, the base station may transmit a grant for a TB including a set of resource elements. The operations of 1705 may be performed according to the methods described herein. In some examples, aspects of the operations of 1705 may be performed by a grant manager as described with reference to FIGS. 11 through 14.

At 1710, the base station may transmit a first DMRS from a first TRP according to a multiplexing scheme between the first DMRS and a second DMRS from a second TRP, where the first DMRS is specific to the first TRP and the second DMRS is specific to one or more of: a second TRP or a combination of the first TRP and the second TRP. The operations of 1710 may be performed according to the methods described herein. In some examples, aspects of the operations of 1710 may be performed by a reference signal manager as described with reference to FIGS. 11 through 14.

At 1715, the base station may transmit, by the first TRP based on the first DMRS, a first portion of the resource elements. The operations of 1715 may be performed according to the methods described herein. In some examples, aspects of the operations of 1715 may be performed by a joint transmission manager as described with reference to FIGS. 11 through 14.

At 1720, the base station may perform, by the first TRP based on the second DMRS, a joint transmission with the second TRP of a second portion of the resource elements. The operations of 1720 may be performed according to the methods described herein. In some examples, aspects of the operations of 1720 may be performed by a joint transmission manager as described with reference to FIGS. 11 through 14.

Figure 18:
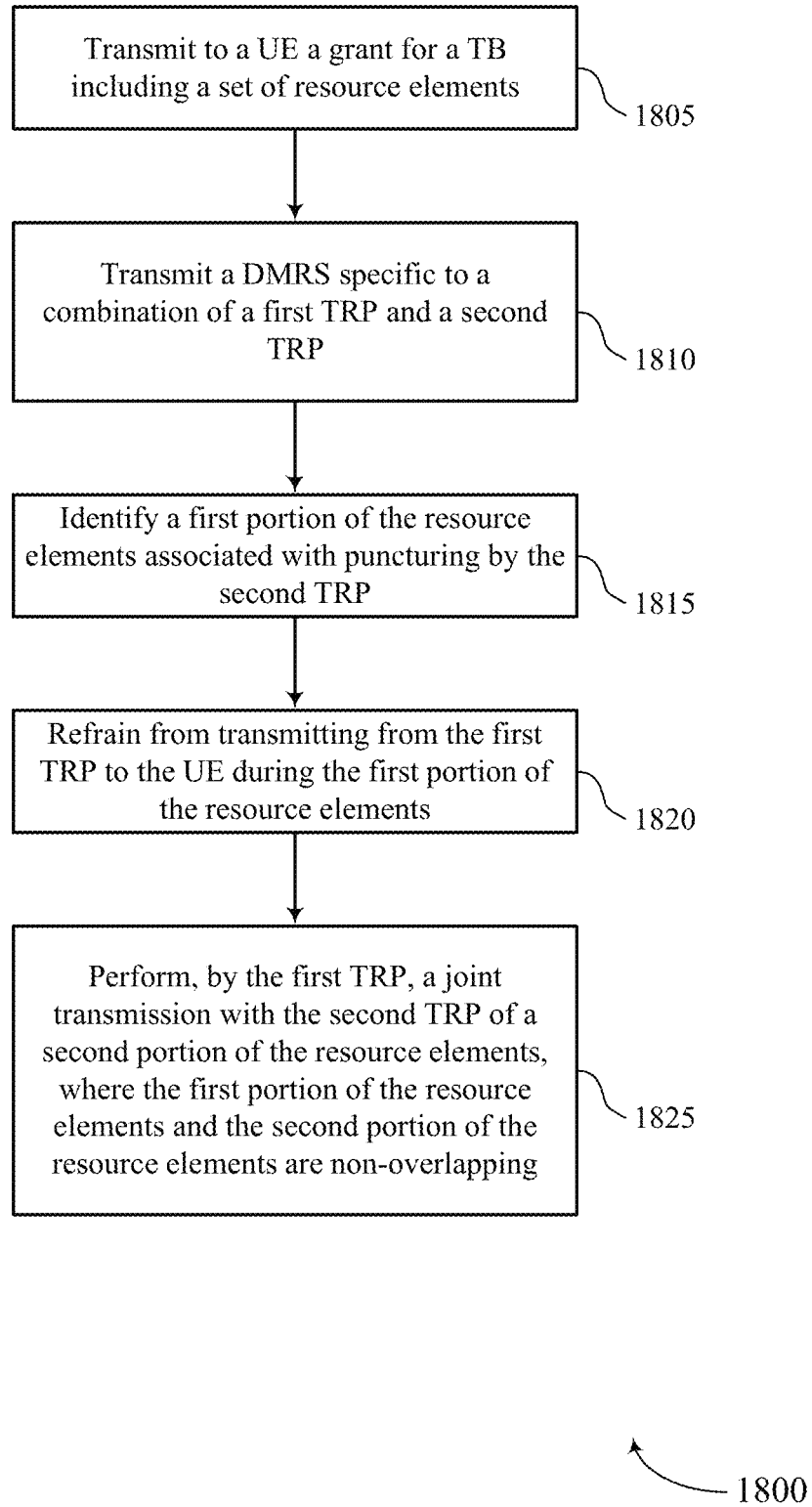

FIG. 18 shows a flowchart illustrating a method 1800 that supports transmission preemption in multi-TRP operation in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1805, the base station may transmit to a UE a grant for a TB including a set of resource elements. The operations of 1805 may be performed according to the methods described herein. In some examples, aspects of the operations of 1805 may be performed by a grant manager as described with reference to FIGS. 11 through 14.

At 1810, the base station may transmit a DMRS specific to a combination of a first TRP and a second TRP. The operations of 1810 may be performed according to the methods described herein. In some examples, aspects of the operations of 1810 may be performed by a reference signal manager as described with reference to FIGS. 11 through 14.

At 1815, the base station may identify a first portion of the resource elements associated with puncturing by the second TRP. The operations of 1815 may be performed according to the methods described herein. In some examples, aspects of the operations of 1815 may be performed by a grant manager as described with reference to FIGS. 11 through 14.

At 1820, the base station may refrain from transmitting from the first TRP to the UE during the first portion of the resource elements. The operations of 1820 may be performed according to the methods described herein. In some examples, aspects of the operations of 1820 may be performed by a joint transmission manager as described with reference to FIGS. 11 through 14.

At 1825, the base station may perform, by the first TRP, a joint transmission with the second TRP of a second portion of the resource elements, where the first portion of the resource elements and the second portion of the resource elements are non-overlapping. The operations of 1825 may be performed according to the methods described herein. In some examples, aspects of the operations of 1825 may be performed by a joint transmission manager as described with reference to FIGS. 11 through 14.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed or unlicensed) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    transmitting a grant for a transport block (TB) comprising a plurality of resource elements;
    transmitting a first demodulation reference signal (DMRS) from a first transmission reception point (TRP) according to a multiplexing scheme between the first DMRS and a second DMRS from a second TRP, wherein the first DMRS is specific to the first TRP and the second DMRS is specific to one or more of: the second TRP or a combination of the first TRP and the second TRP;

transmitting, by the first TRP based at least in part on the first DMRS, a first portion of the resource elements, the first portion of the resource elements associated with puncturing by the second TRP; and performing, by the first TRP based at least in part on the second DMRS, a joint transmission with the second TRP of a second portion of the resource elements.

2. The method of claim 1, wherein the multiplexing scheme uses one or more of spatial multiplexing, frequency domain multiplexing, or code domain multiplexing.

3. The method of claim 1, wherein transmitting the first DMRS comprises:
transmitting a first symbol of the first portion of the resource elements, the first symbol comprising the first DMRS.

4. The method of claim 3, wherein transmitting the first portion of the resource elements of the TB comprises:
transmitting one or more symbols subsequent to the first symbol of the first portion of the resource elements, the one or more symbols subsequent to the first symbol of the first portion of the resource elements comprising data of the TB.

5. The method of claim 1, further comprising:
transmitting a first preemption indication (PI) message indicating that the first portion of the resource elements is punctured by the second TRP.

6. The method of claim 5, further comprising:
transmitting a second PI message indicating that a third portion of the resource elements of the TB is punctured by the first TRP.

7. The method of claim 5, wherein the first PI message further indicates that a third portion of the resource elements of the TB is punctured by the first TRP.

8. A method for wireless communication, comprising:
transmitting to a user equipment (UE) a grant for a transport block (TB) comprising a plurality of resource elements;
transmitting a demodulation reference signal (DMRS) specific to a combination of a first transmission reception point (TRP) and a second TRP;
refraining from transmitting from the first TRP to the UE during a first portion of the resource elements, the first portion of the resource elements associated with puncturing by the second TRP; and
performing, by the first TRP, a joint transmission with the second TRP of a second portion of the resource elements, wherein the first portion of the resource elements and the second portion of the resource elements are non-overlapping.

9. The method of claim 8, further comprising:
transmitting a preemption indication (PI) message indicating the first portion of the resource elements.

10. An apparatus for wireless communication, comprising:
one or more processors,
one or more memories in electronic communication with the one or more processors; and
instructions stored in the one or more memories and executable by the one or more processors to cause the apparatus to:
transmit a grant for a transport block (TB) comprising a plurality of resource elements;
transmit a first demodulation reference signal (DMRS) from a first transmission reception point (TRP) according to a multiplexing scheme between the first DMRS and a second DMRS from a second TRP, wherein the first DMRS is specific to the first TRP and the second DMRS is specific to one or more of: the second TRP or a combination of the first TRP and the second TRP;
transmit, by the first TRP based at least in part on the first DMRS, a first portion of the resource elements, the first portion of the resource elements associated with puncturing by the second TRP; and
perform, by the first TRP based at least in part on the second DMRS, a joint transmission with the second TRP of a second portion of the resource elements.

11. The apparatus of claim 10, wherein the multiplexing scheme uses one or more of spatial multiplexing, frequency domain multiplexing, or code domain multiplexing.

12. The apparatus of claim 10, wherein the instructions are further executable by the one or more processors to cause the apparatus to transmit the first DMRS by:
transmitting a first symbol of the first portion of the resource elements, the first symbol comprising the first DMRS.

13. The apparatus of claim 12, wherein the instructions are further executable by the one or more processors to cause the apparatus to transmit the first portion of the resource elements of the TB by:
transmitting one or more symbols subsequent to the first symbol of the first portion of the resource elements, the one or more symbols subsequent to the first symbol of the first portion of the resource elements comprising data of the TB.

14. The apparatus of claim 10, further comprising:
transmitting a first preemption indication (PI) message indicating that the first portion of the resource elements is punctured by the second TRP.

15. The apparatus of claim 14, further comprising:
transmitting a second PI message indicating that a third portion of the resource elements of the TB is punctured by the first TRP.

16. The apparatus of claim 14, wherein the first PI message further indicates that a third portion of the resource elements of the TB is punctured by the first TRP.

17. An apparatus for wireless communication, comprising:
one or more processors,
one or more memories in electronic communication with the one or more processors; and
instructions stored in the one or more memories and executable by the one or more processors to cause the apparatus to:
transmit to a user equipment (UE) a grant for a transport block (TB) comprising a plurality of resource elements;
transmit a demodulation reference signal (DMRS) specific to a combination of a first transmission reception point (TRP) and a second TRP;
refrain from transmitting from the first TRP to the UE during a first portion of the resource elements, the first portion of the resource elements associated with puncturing by the second TRP; and
perform, by the first TRP, a joint transmission with the second TRP of a second portion of the resource elements, wherein the first portion of the resource elements and the second portion of the resource elements are non-overlapping.

18. The apparatus of claim 17, further comprising:
transmitting a preemption indication (PI) message indicating the first portion of the resource elements.

19. An apparatus for wireless communication at a user equipment (UE), comprising:

one or more processors;

one or more memories in electronic communication with the one or more processors; and instructions stored in the one or more memories and executable by the one or more processors to cause the apparatus to:

receive a grant for a transport block (TB) comprising a plurality of resource elements;

receive a demodulation reference signal (DMRS) specific to a combination of a first transmission reception point (TRP) and a second TRP;

receive a preemption indication (PI) message indicating a first portion of the resource elements associated with puncturing; and receive, based at least in part on the DMRS, a joint transmission of a second portion of the resource elements from the first TRP and the second TRP, wherein the first portion of the resource elements and the second portion of the resource elements are non-overlapping.

20. The apparatus of claim 19, wherein the PI message is received over one or more of the first TRP, the second TRP, or a combination thereof.

21. The apparatus of claim 19, wherein the instructions executable by the one or more processors to receive the joint transmission of the second portion of the resource elements comprise instructions executable by the one or more processors to:

ignore the first portion of the resource elements.

22. The apparatus of claim 19, wherein the instructions are further executable by the one or more processors to cause the apparatus to:

perform a channel detection and demodulation procedure using the second portion of the resource elements based at least in part on receiving the joint transmission.

23. The apparatus of claim 19, wherein the first portion of the resource elements is punctured by one or more high priority transmissions.

24. The apparatus of claim 23, wherein the one or more high priority transmissions comprise at least one ultra-reliable low latency communication transmission.

* * * * *